US012217701B2

(12) United States Patent
Park et al.

(10) Patent No.: US 12,217,701 B2
(45) Date of Patent: Feb. 4, 2025

(54) DATA COMPENSATING CIRCUIT AND DISPLAY DEVICE INCLUDING THE SAME

(71) Applicant: Samsung Display Co., Ltd., Yongin-Si (KR)

(72) Inventors: Jong-Woong Park, Seongnam-si (KR); Weonjun Choe, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/983,276

(22) Filed: Aug. 3, 2020

(65) Prior Publication Data

US 2021/0056912 A1 Feb. 25, 2021

(30) Foreign Application Priority Data

Aug. 20, 2019 (KR) ........................ 10-2019-0102007

(51) Int. Cl.
*G09G 3/3275* (2016.01)
*G09G 3/20* (2006.01)

(52) U.S. Cl.
CPC ......... *G09G 3/3275* (2013.01); *G09G 3/2092* (2013.01); *G09G 2300/0417* (2013.01); *G09G 2300/0857* (2013.01); *G09G 2320/0285* (2013.01); *G09G 2360/16* (2013.01)

(58) Field of Classification Search
None
See application file for complete search history.

(56) References Cited

U.S. PATENT DOCUMENTS 7,675,492 B2 3/2010 Park et al.
2003/0214521 A1* 11/2003 Osame ................ G09G 3/3283 345/690
2005/0285822 A1* 12/2005 Reddy .................. H01L 27/288 345/76

(Continued)

FOREIGN PATENT DOCUMENTS

KR 1020140082498 A 7/2014
KR 1020190049990 A 5/2019
KR 1020190083022 A 7/2019

*Primary Examiner* — Benjamin C Lee
*Assistant Examiner* — Emily J Frank
(74) *Attorney, Agent, or Firm* — CANTOR COLBURN LLP

(57) ABSTRACT

A data compensating circuit includes a stress data generating block which generates stress data for each pixel based on input image data or output image data, a memory control block which updates accumulated stress data for each pixel, a first compensating block which reads the accumulated stress data for each pixel from a first non-volatile memory device to generate afterimage compensation data for each pixel, a compensation data summing block which reads optical compensation data for each pixel from a second non-volatile memory device to generate luminance compensation data for each pixel by summing the afterimage compensation data for each pixel and the optical compensation data for each pixel, an internal memory device which stores the luminance compensation data for each pixel, and a second compensating block which generates the output image data by compensating for the input image data based on the luminance compensation data for each pixel.

20 Claims, 15 Drawing Sheets

(56) References Cited

U.S. PATENT DOCUMENTS

| | | | | |
|---|---|---|---|---|
| 2007/0290958 | A1* | 12/2007 | Cok | G09G 3/3225 345/77 |
| 2010/0019997 | A1* | 1/2010 | Chui | G09G 3/18 345/83 |
| 2017/0162103 | A1* | 6/2017 | An | G09G 3/3208 |
| 2017/0249882 | A1* | 8/2017 | Lee | G09G 3/3275 |
| 2019/0130845 | A1 | 5/2019 | Han et al. | |
| 2019/0205605 | A1 | 7/2019 | Kim | |
| 2019/0259325 | A1* | 8/2019 | Chaji | G06T 7/90 |
| 2019/0266966 | A1* | 8/2019 | Wang | G09G 3/006 |
| 2020/0160791 | A1* | 5/2020 | Chung | G09G 3/3275 |
| 2020/0184887 | A1* | 6/2020 | Nien | G09G 3/3225 |
| 2020/0365081 | A1* | 11/2020 | Chang | G06F 1/10 |
| 2021/0183310 | A1* | 6/2021 | Hu | G09G 3/3233 |
| 2021/0192998 | A1* | 6/2021 | Song | G09G 3/3233 |
| 2022/0084447 | A1* | 3/2022 | Kishimoto | H04N 17/04 |

* cited by examiner

DATA COMPENSATING CIRCUIT AND DISPLAY DEVICE INCLUDING THE SAME

This application claims priority to Korean Patent Application No. 10-2019-0102007, filed on Aug. 20, 2019, and all the benefits accruing therefrom under 35 USC § 119, the content of which in its entirety is herein incorporated by reference.

BACKGROUND

1. Field

Embodiments relate generally to a data compensation. More particularly, embodiments of the invention relate to a data compensating circuit that performs a data compensation such as afterimage compensation, an optical compensation, etc., and a display device including the data compensating circuit.

2. Description of the Related Art

Recently, an organic light-emitting display device is widely used as a display device included in an electronic device. Generally, an optical characteristic deviation may exist between pixels included in a display panel of the organic light-emitting display device due to various factors in a manufacturing process, and thus an optical characteristic deviation may exist between same display panels, which are manufactured by a same process. That is, even when same data is applied to the same display panels, color coordinates and/or luminance of respective images displayed on the display panels may differ from each other. Thus, in the manufacturing process of the organic light-emitting display device, a luminance image may be generated by optically capturing a test image displayed on a display panel, optical compensation data for each pixel for compensating for the optical characteristic deviation may be generated by analyzing the luminance image, and then the optical compensation data for each pixel may be stored in a memory device included in the organic light-emitting display device. Thus, the organic light-emitting display device may generate output image data by performing optical compensation on input image data based on the optical compensation data for each pixel. In addition, the pixels included in the display panel of the organic light-emitting display device may be deteriorated as a use time increases, and thus an afterimage may occur in a display region where deteriorated pixels are located. Hence, while the organic light-emitting display device performs a displaying operation, accumulated stress data for each pixel may be generated by accumulating stress data for each pixel, and the accumulated stress data for each pixel may be stored in a memory device included in the organic light-emitting display device. Here, the accumulated stress data for each pixel may be converted into afterimage compensation data for each pixel based on a predetermined deterioration curve modeled by considering a luminance drop amount according to various conditions (e.g., time, temperature, luminance, current, etc.). Thus, the organic light-emitting display device may generate the output image data by performing afterimage compensation on the input image data based on the afterimage compensation data for each pixel.

SUMMARY

In a conventional organic light-emitting display device, the afterimage compensation and the optical compensation are typically performed separately, such that memory devices included in the conventional organic light-emitting display device may not be efficiently used.

Embodiments provide a data compensating circuit capable of allowing a display device to use luminance compensation data for each pixel generated by summing afterimage compensation data for each pixel and optical compensation data for each pixel when the display device performs afterimage compensation and optical compensation so that the display device may simultaneously perform the afterimage compensation and the optical compensation to efficiently use memory devices therein.

Embodiments provide a display device including the data compensating circuit capable of simultaneously performing the afterimage compensation and the optical compensation to efficiently use memory devices therein.

According to an embodiment of the invention, a data compensating circuit includes a stress data generating block which generates stress data for each pixel based on input image data or output image data, a memory control block which updates accumulated stress data for each pixel by accumulating the stress data for each pixel in a first non-volatile memory device, a first compensating block which reads the accumulated stress data for each pixel from the first non-volatile memory device and generate afterimage compensation data for each pixel based on the accumulated stress data for each pixel while a state of a display device is changed (or switched) from a sleep state or a turn-off state to a turn-on state, a compensation data summing block which reads optical compensation data for each pixel from a second non-volatile memory device and generates luminance compensation data for each pixel by summing the afterimage compensation data for each pixel and the optical compensation data for each pixel while the state of the display device is changed from the sleep state or the turn-off state to the turn-on state, where the second non-volatile memory device is physically separate from the first non-volatile memory device, an internal memory device which stores the luminance compensation data for each pixel, and a second compensating block which generates the output image data by compensating for the input image data based on the luminance compensation data for each pixel.

In an embodiment, the internal memory device may be a volatile memory device. In such an embodiment, the luminance compensation data for each pixel stored in the internal memory device may be lost after the state of the display device is changed from the turn-on state to the sleep state or the turn-off state.

In an embodiment, the internal memory device may operate at a higher speed than the first and second non-volatile memory devices, each of the first and second non-volatile memory devices may be a flash memory device, and the internal memory device may be a static random access memory device.

In embodiments, the first compensating block may generate the afterimage compensation data for each pixel by reading only a portion of the accumulated stress data for each pixel from the first non-volatile memory device.

In an embodiment, the accumulated stress data for each pixel may have a first size, and each of the afterimage compensation data for each pixel and the optical compensation data for each pixel may have a second size which is smaller than the first size.

In an embodiment, the first compensating block may not read the accumulated stress data for each pixel from the first non-volatile memory device after the state of the display device is changed from the sleep state or the turn-off state to the turn-on state.

In an embodiment, the memory control block may update the accumulated stress data for each pixel by accumulating the stress data for each pixel in the first non-volatile memory device in real-time after the state of the display device is changed from the sleep state or the turn-off state to the turn-on state.

According to another embodiment of the invention, a data compensating circuit includes a stress data generating block which generates stress data for each pixel based on input image data or output image data, a first internal memory device which operates at a higher speed than a first non-volatile memory device, a memory control block which moves accumulated stress data for each pixel stored in the first non-volatile memory device into the first internal memory device while a state of a display device is changed from a sleep state or a turn-off state to a turn-on state and to update the accumulated stress data for each pixel by accumulating the stress data for each pixel in the first internal memory device when the state of the display device is the turn-on state, a first compensating block which reads the accumulated stress data for each pixel from the first non-volatile memory device and generate afterimage compensation data for each pixel based on the accumulated stress data for each pixel while the state of the display device is changed from the sleep state or the turn-off state to the turn-on state, a compensation data summing block which reads optical compensation data for each pixel from a second non-volatile memory device and generates luminance compensation data for each pixel by summing the afterimage compensation data for each pixel and the optical compensation data for each pixel while the state of the display device is changed from the sleep state or the turn-off state to the turn-on state, where the second non-volatile memory device is physically separate from the first non-volatile memory device, a second internal memory device which stores the luminance compensation data for each pixel, and a second compensating block which generates the output image data by compensating for the input image data based on the luminance compensation data for each pixel.

In an embodiment, each of the first and second internal memory devices may be a volatile memory device. In such an embodiment, the accumulated stress data for each pixel stored in the first internal memory device may be lost and the luminance compensation data for each pixel stored in the second internal memory device may be lost after the state of the display device is changed from the turn-on state to the sleep state or the turn-off state.

In an embodiment, the first and second internal memory devices may operate at a higher speed than the first and second non-volatile memory devices, each of the first and second non-volatile memory devices may be a flash memory device, and each of the first and second internal memory devices may be a static random access memory device.

In an embodiment, the first compensating block may generate the afterimage compensation data for each pixel by reading only a portion of the accumulated stress data for each pixel from the first non-volatile memory device.

In an embodiment, the accumulated stress data for each pixel may have a first size, and each of the afterimage compensation data for each pixel and the optical compensation data for each pixel may have a second size which is smaller than the first size.

In an embodiment, the first compensating block may not read the accumulated stress data for each pixel from the first non-volatile memory device after the state of the display device is changed from the sleep state or the turn-off state to the turn-on state.

In an embodiment, the memory control block may back up the accumulated stress data for each pixel stored in the first internal memory device to the first non-volatile memory device at a predetermined cycle after the state of the display device is changed from the sleep state or the turn-off state to the turn-on state.

According to an embodiment of the invention, a display device includes a display panel including a plurality of pixels, a data driving circuit which provides a data signal to the display panel, a scan driving circuit which provides a scan signal to the display panel, a data compensating circuit which compensates for input image data to generate output image data corresponding to the data signal, and a timing control circuit which controls the data driving circuit, the scan driving circuit, and the data compensating circuit. In such an embodiment, the data compensating circuit includes a stress data generating block which generates stress data for each pixel based on the input image data or the output image data, a memory control block which updates accumulated stress data for each pixel by accumulating the stress data for each pixel in a first non-volatile memory device, a first compensating block which reads the accumulated stress data for each pixel from the first non-volatile memory device and generates afterimage compensation data for each pixel based on the accumulated stress data for each pixel while a state of the display device is changed from a sleep state or a turn-off state to a turn-on state, a compensation data summing block which reads optical compensation data for each pixel from a second non-volatile memory device and generates luminance compensation data for each pixel by summing the afterimage compensation data for each pixel and the optical compensation data for each pixel while the state of the display device is changed from the sleep state or the turn-off state to the turn-on state, where the second non-volatile memory device is physically separate from the first non-volatile memory device, an internal volatile memory device which stores the luminance compensation data for each pixel, and a second compensating block which generates the output image data by compensating for the input image data based on the luminance compensation data for each pixel.

In an embodiment, the data compensating circuit may be included in the timing control circuit.

In an embodiment, the first compensating block may generate the afterimage compensation data for each pixel by reading only a portion of the accumulated stress data for each pixel from the first non-volatile memory device.

In an embodiment, the accumulated stress data for each pixel may have a first size, and each of the afterimage compensation data for each pixel and the optical compensation data for each pixel may have a second size which is smaller than the first size.

In an embodiment, the first compensating block may not read the accumulated stress data for each pixel from the first non-volatile memory device after the state of the display device is changed from the sleep state or the turn-off state to the turn-on state.

In an embodiment, the memory control block may update the accumulated stress data for each pixel by accumulating the stress data for each pixel in the first non-volatile memory device in real-time after the state of the display device is changed from the sleep state or the turn-off state to the turn-on state.

In embodiments of the invention, a data compensating circuit may allow a display device to simultaneously perform afterimage compensation and optical compensation to efficiently use memory devices included in the display device by including a stress data generating block which generates stress data for each pixel based on input image data or output image data, a memory control block which updates accumulated stress data for each pixel by accumulating the stress data for each pixel in a first non-volatile memory device, a first compensating block which reads the accumulated stress data for each pixel from the first non-volatile memory device and generates afterimage compensation data for each pixel based on the accumulated stress data for each pixel while a state of the display device is changed from a sleep state or a turn-off state to a turn-on state, a compensation data summing block which reads optical compensation data for each pixel from a second non-volatile memory device that is physically separate from the first non-volatile memory device and generates luminance compensation data for each pixel by summing the afterimage compensation data for each pixel and the optical compensation data for each pixel while the state of the display device is changed from the sleep state or the turn-off state to the turn-on state, an internal memory device which stores the luminance compensation data for each pixel, and a second compensating block which generates the output image data by compensating for the input image data based on the luminance compensation data for each pixel.

In embodiments of the invention, a data compensating circuit may allow a display device to simultaneously perform afterimage compensation and optical compensation to efficiently use memory devices included in the display device by including a stress data generating block which generates stress data for each pixel based on input image data or output image data, a first internal memory device which operates at a higher speed than a first non-volatile memory device, a memory control block which moves accumulated stress data for each pixel stored in the first non-volatile memory device into the first internal memory device while a state of the display device is changed from a sleep state or a turn-off state to a turn-on state and updates the accumulated stress data for each pixel by accumulating the stress data for each pixel in the first internal memory device when the state of the display device is the turn-on state, a first compensating block which reads the accumulated stress data for each pixel from the first non-volatile memory device and generates afterimage compensation data for each pixel based on the accumulated stress data for each pixel while the state of the display device is changed from the sleep state or the turn-off state to the turn-on state, a compensation data summing block which reads optical compensation data for each pixel from a second non-volatile memory device that is physically separate from the first non-volatile memory device and generates luminance compensation data for each pixel by summing the afterimage compensation data for each pixel and the optical compensation data for each pixel while the state of the display device is changed from the sleep state or the turn-off state to the turn-on state, a second internal memory device which stores the luminance compensation data for each pixel, and a second compensating block which generates the output image data by compensating for the input image data based on the luminance compensation data for each pixel.

In embodiments of the invention, a display device may simultaneously perform the afterimage compensation and the optical compensation to efficiently use memory devices therein by including the data compensating circuit.

BRIEF DESCRIPTION OF THE DRAWINGS

The above and other features of embodiments will be more apparent from the following description taken in conjunction with the accompanying drawings, in which.

DETAILED DESCRIPTION

Figure 1:
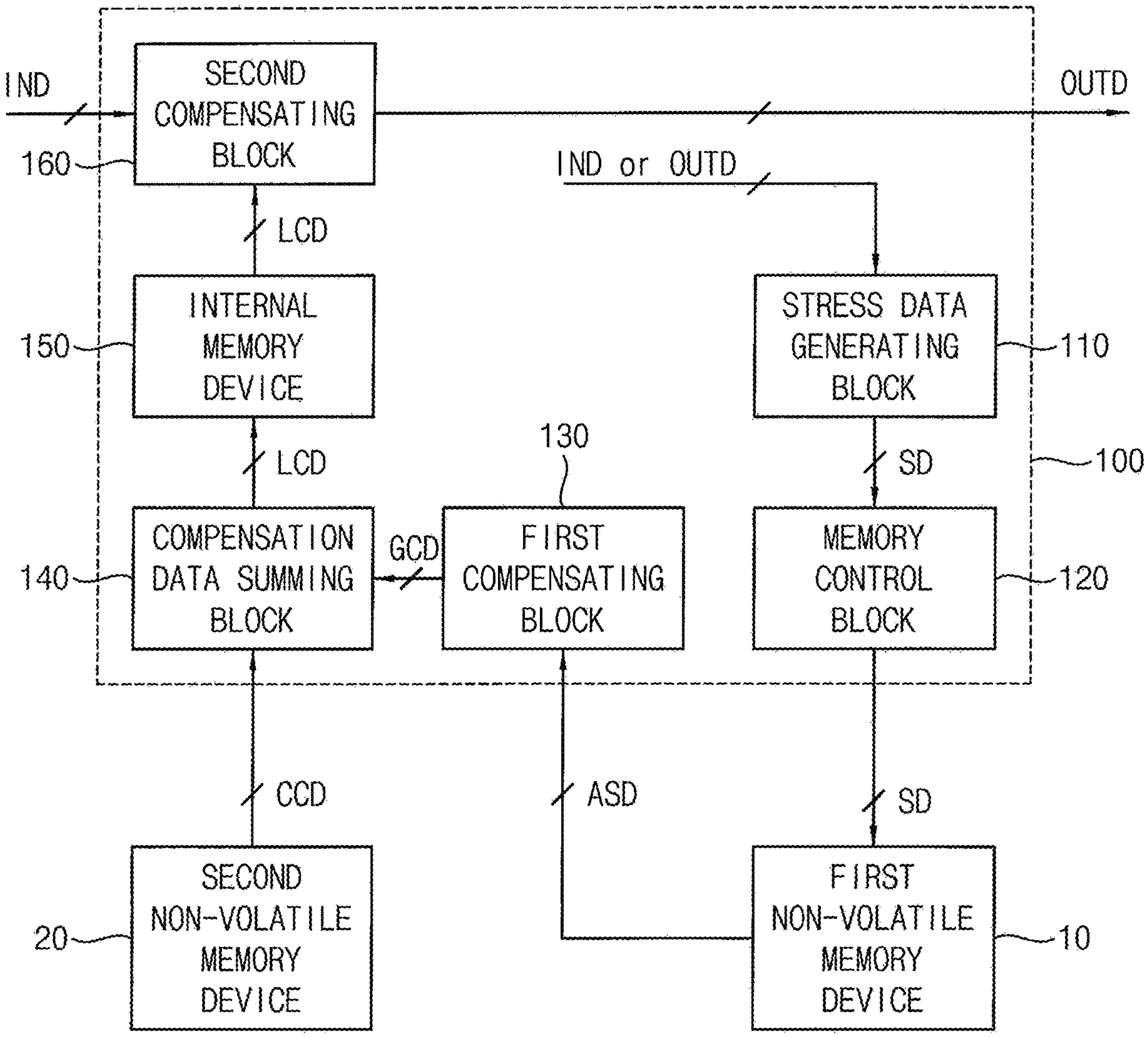
FIG. 1 is a block diagram illustrating a data compensating circuit according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or"

includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

FIG. 1 is a block diagram illustrating a data compensating circuit according to an embodiment.

Referring to FIG. 1, an embodiment of a data compensating circuit 100 may include a stress data generating block 110, a memory control block 120, a first compensating block 130, a compensation data summing block 140, an internal memory device 150, and a second compensating block 160. In such an embodiment, the data compensating circuit 100 may perform a data write operation and a data read operation on a first non-volatile memory device 10 that is located outside the data compensating circuit 100. In such an embodiment, the data compensating circuit 100 may perform a data read operation on a second non-volatile memory device 20 that is located outside the data compensating circuit 100 or may perform a data write operation and a data read operation on the second non-volatile memory device 20.

The stress data generating block 110 may generate stress data for each pixel SD based on input image data IND or output image data OUTD. In an embodiment, the stress data generating block 110 may generate the stress data for each pixel SD at a frame rate (or a display rate) (e.g., 60 Hz to 120 Hz). The memory control block 120 may update accumulated stress data for each pixel ASD by accumulating the stress data for each pixel SD in the first non-volatile memory device 10. In an embodiment, the memory control block 120 may accumulate the stress data for each pixel SD in the first non-volatile memory device 10 at an accumulative rate (e.g., less than 1 Hz) corresponding to an operating speed of the first non-volatile memory device 10. The first non-volatile memory device 10 may maintain (or retain) the accumulated stress data for each pixel ASD even when a display device is in a turn-off state. In an embodiment, the first non-volatile memory device 10 may be implemented by a flash memory device that operates at a relatively low speed. In one embodiment, for example, the stress data for each pixel SD may be a value corresponding to luminance for each pixel of the input image data IND or the output image data OUTD, and the accumulated stress data for each pixel ASD may be a value that is generated by accumulating the value corresponding to the luminance for each pixel of the input image data IND or the output image data OUTD. In one embodiment, for example, the stress data for each pixel SD may be a value corresponding to a gray-level for each pixel of the input image data IND or the output image data OUTD, and the accumulated stress data for each pixel ASD may be a value that is generated by accumulating the value corresponding to the gray-level for each pixel of the input image data IND or the output image data OUTD. However, the stress data for each pixel SD and the accumulated stress data for each pixel ASD are not limited thereto. Alternatively, the stress data for each pixel SD and the accumulated stress data for each pixel ASD may be generated in consideration of various other conditions (e.g., time, temperature, luminance, current, etc.).

The first compensating block 130 may read the accumulated stress data for each pixel ASD from the first non-volatile memory device 10 and may generate afterimage compensation data for each pixel GCD based on the accumulated stress data for each pixel ASD while a state of the display device is changed (or switched) from a sleep state or a turn-off state to a turn-on state, that is, during a state changing period in which the state of the display device is being changed from the sleep state or the turn-off state to the turn-on state. Herein, the phrase "from the sleep state or the turn-off state to the turn-on state" means "from the sleep state to the turn-on state or from the turn-off state to the turn-on state" or "from one of the sleep state and the turn-off state to the turn-on state." In one embodiment, for example, the first compensating block 130 may generate the afterimage compensation data for each pixel GCD for performing the afterimage compensation by calculating a luminance drop amount for each pixel by applying the accumulated stress data for each pixel ASD to a predetermined deterioration curve and by calculating a luminance compensation amount for each pixel corresponding to the luminance drop amount for each pixel. In an embodiment, the first compensating block 130 may generate the afterimage compensation data for each pixel GCD by reading only a portion of the accumulated stress data for each pixel ASD from the first non-volatile memory device 10. In one embodiment, for example, the first compensating block 130 may generate the afterimage compensation data for each pixel GCD by reading only some most significant bits (also referred to as "MSB") of the accumulated stress data for each pixel ASD from the first non-volatile memory device 10. In such an embodiment, the accumulated stress data for each pixel ASD may have a first size (e.g., 32-bit), a portion of the accumulated stress data for each pixel ASD which the first compensating block 130 reads from the first non-volatile memory device 10 may have a third size (e.g., 16-bit) that is smaller than the first size, and the afterimage compensation data for each pixel GCD may have the third size that is smaller than the first size. In such an embodiment, the first compensating block 130 reads the accumulated stress data for each pixel ASD from the first non-volatile memory device 10 that operates at a relatively low speed, such that it may take a relatively long time to generate the afterimage compensation data for each pixel GCD. However, in such an embodiment, since the time is shorter than a time during which the state of the display device is changed from the sleep state or the turn-off state to the turn-on state, all of the afterimage compensation data for each pixel GCD for performing the afterimage compensation may be generated before the state of the display device is changed to the turn-on state.

The compensation data summing block 140 may read optical compensation data for each pixel CCD from a second non-volatile memory device 20 that is physically separate from the first non-volatile memory device 10 and may generate luminance compensation data for each pixel LCD by summing the afterimage compensation data for each pixel GCD received from the first compensating block 130 and the optical compensation data for each pixel CCD while the state of the display device is changed from the sleep state or the turn-off state to the turn-on state. In one embodiment, for example, the optical compensation data for each pixel CCD may include information on a luminance compensation amount for each pixel corresponding to the luminance drop amount for each pixel due to optical characteristic deviation in a manufacturing process of the display device. In an embodiment, a manufacturer of the display device may display a test image on a display panel in the manufacturing process of the display device, may generate a luminance image by optically capturing the test image, may generate the optical compensation data for each pixel CCD for compensating for the optical characteristic deviation by analyzing the luminance image, and may store the optical compensation data for each pixel CCD in the second non-volatile memory device 20 included in the display device. In one embodiment, for example, the optical compensation data for each pixel CCD may have a second size (e.g., 8-bit) that is smaller than the first size (e.g., 32-bit) of the accumulated stress data for each pixel ASD. In such an embodiment, the second non-volatile memory device 20 may maintain the optical compensation data for each pixel CCD even when the display device is in the turn-off state. In an embodiment, the second non-volatile memory device 20 may be implemented by a flash memory device that operates at a relatively low speed. In an embodiment, the optical compensation data for each pixel CCD stored in the second non-volatile memory device 20 may not be updated. In such an embodiment, the optical compensation data for each pixel CCD stored in the second non-volatile memory device 20 may have a fixed value. In an alternative embodiment, the optical compensation data for each pixel CCD stored in the second non-volatile memory device 20 may be updated by the manufacturer or a user of the display device. In such an embodiment, as described above, the luminance compensation data for each pixel LCD is generated by summing the afterimage compensation data for each pixel GCD for performing the afterimage compensation and the optical compensation data for each pixel CCD for performing the optical compensation, such that the afterimage compensation and the optical compensation may be simultaneously performed on the input image data IND when the input image data IND is compensated for based on the luminance compensation data for each pixel LCD.

The internal memory device 150 may store the luminance compensation data for each pixel LCD that is generated by summing (or combining) the afterimage compensation data for each pixel GCD for performing the afterimage compensation and the optical compensation data for each pixel CCD for performing the optical compensation. In an embodiment, the internal memory device 150 may be a volatile memory device. In one embodiment, for example, the internal memory device 150 may be implemented by a static random access memory device that operates at a relatively high speed. Thus, after the state of the display device is changed from the turn-on state to the sleep state or the turn-off state (that is, during a period after the state changing period ends), the luminance compensation data for each pixel LCD stored in the internal memory device 150 may be lost. In an embodiment, after the luminance compensation data for each pixel LCD is stored in the internal memory device 150 as the state of the display device is changed from the sleep state or the turn-off state to the turn-on state, the first compensating block 130 may not read the accumulated stress data for each pixel ASD from the first non-volatile memory device 10 and thus may not generate the afterimage compensation data for each pixel GCD based on the accumulated stress data for each pixel ASD. Thus, after the luminance compensation data for each pixel LCD is stored in the internal memory device 150 as the state of the display device is changed from the sleep state or the turn-off state to the turn-on state, the luminance compensation data for each pixel LCD stored in the internal memory device 150 may not be changed even when the memory control block 120 updates the accumulated stress data for each pixel ASD by accumulating the stress data for each pixel SD in the first non-volatile memory device 10 in real-time. That is, the luminance compensation data for each pixel LCD stored in the internal memory device 150 may not be affected by updates of the accumulated stress data for each pixel ASD when the display device is in the turn-on state. When the display device is in the turn-on state, the updates of the accumulated stress data for each pixel ASD may not be reflected on the luminance compensation data for each pixel LCD stored in the internal memory device 150. However, because deterioration of pixels included in the display panel proceeds slowly, image quality degradation due to the existing (or non-updated) accumulated stress data for each pixel ASD (that is, the accumulated stress data for each pixel ASD stored in the internal memory device 150 before the updates) may not be substantial or recognizable. After the state of the display device is changed from the turn-on state to the sleep state or the turn-off state, the luminance compensation data for each pixel LCD stored in the internal memory device 150 may be lost. Next, as the state of the display device is changed from the sleep state or the turn-off state to the turn-on state, the updated luminance compensation data for each pixel LCD that is generated by reflecting the updated afterimage compensation data for each pixel GCD corresponding to the updated accumulated stress data for each pixel ASD stored in the first non-volatile memory device 10 may be stored in the internal memory device 150.

The second compensating block 160 may generate the output image data OUTD (i.e., compensated input image data that is generated by performing both the afterimage compensation and the optical compensation by compensating for the input image data IND based on the luminance compensation data for each pixel LCD. In such an embodiment, the luminance compensation data for each pixel LCD includes the afterimage compensation data for each pixel GCD for performing the afterimage compensation and the optical compensation data for each pixel CCD for performing the optical compensation, such that the second compensating block 160 may simultaneously perform the afterimage compensation and the optical compensation on the input image data IND by simply compensating for the input image data IND based on the luminance compensation data for each pixel LCD. In such an embodiment, the data compensating circuit 100 may allow the display device to simultaneously perform the afterimage compensation and the optical compensation to efficiently use memory devices included in the display device (e.g., reducing the number, capacity, etc. of the memory devices included in the display device) by including the stress data generating block 110 that generates the stress data for each pixel SD based on the input image data IND or the output image data OUTD, the memory control block 120 that updates the accumulated stress data for each pixel ASD by accumulating the stress data for each pixel SD in the first non-volatile memory device 10, the first compensating block 130 that reads the accumulated stress data for each pixel ASD from the first non-volatile memory device 10 and generates the afterimage compensation data for each pixel GCD based on the accumulated stress data for each pixel ASD while the state of the display device is changed from the sleep state or the turn-off state to the turn-on state, the compensation data summing block 140 that reads the optical compensation data for each pixel CCD from the second non-volatile memory device 20 that is physically separate from the first non-volatile memory device 10 and generates the luminance compensation data for each pixel LCD by summing the afterimage compensation data for each pixel GCD and the optical compensation data for each pixel CCD while the state of the display device is changed from the sleep state or the turn-off state to the turn-on state, the internal memory device 150 that stores the luminance compensation data for each pixel LCD, and the second compensating block 160 that generates the output image data OUTD by compensating for the input image data IND based on the luminance compensation data for each pixel LCD.

FIGS. 2A to 2E are diagrams illustrating a process in which the data compensation circuit of FIG. 1 uploads luminance compensation data for each pixel to an internal memory device.

FIGS. 2A to 2E show a process in which the luminance compensation data for each pixel LCD is stored in the internal memory device 150 included in the data compensating circuit 100, the luminance compensation data for each pixel LCD is lost in the internal memory device 150 included in the data compensating circuit 100, and then the updated luminance compensation data for each pixel UD-LCD is stored in the internal memory device 150 included in the data compensating circuit 100.

Figure 2A:
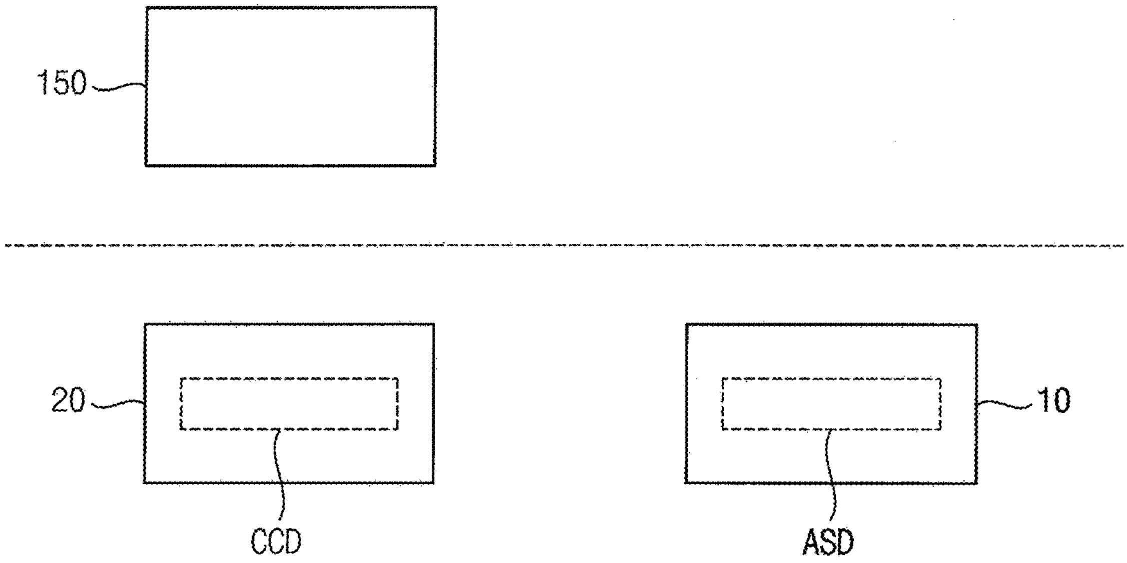
FIGS. 2A to 2E are diagrams illustrating a process in which the data compensation circuit of FIG. 1 uploads luminance compensation data for each pixel to an internal memory device.

In an embodiment, as illustrated in FIG. 2A, when the display device is in the sleep state or the turn-off state, the accumulated stress data for each pixel ASD may be stored in the first non-volatile memory device 10, and the optical compensation data for each pixel CCD may be stored in the second non-volatile memory device 20. In such an embodiment, since power is not supplied to the internal memory device 150 when the display device is in the sleep state or the turn-off state, no data may be stored in the internal memory device 150 since a previous luminance compensation data for each pixel LCD stored in the internal memory device 150 that is implemented by the volatile memory device (e.g., the static random access memory device, etc.) has been lost.

Figure 2B:
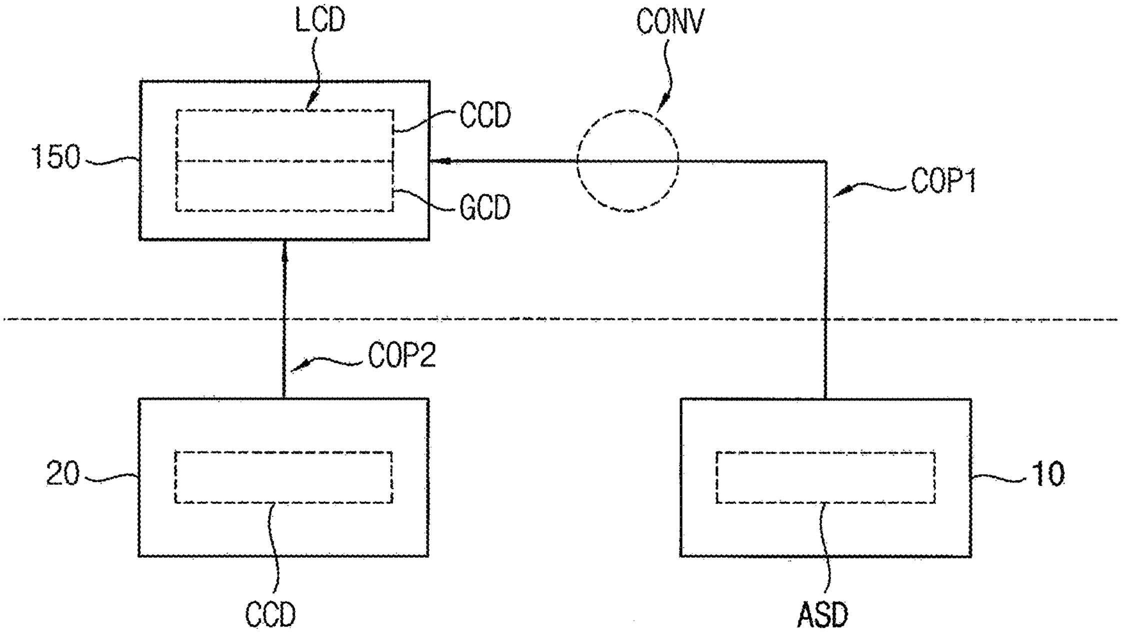

In such an embodiment, as illustrated in FIG. 2B, while the state of the display device is changed from the sleep state or the turn-off state to the turn-on state, the accumulated stress data for each pixel ASD stored in the first non-volatile memory device 10 may be read (i.e., indicated by COP1), the accumulated stress data for each pixel ASD may be converted into the afterimage compensation data for each pixel GCD (i.e., indicated by CONY), the optical compensation data for each pixel CCD stored in the second non-volatile memory device 20 may be read (i.e., indicated by COP2), and then the luminance compensation data for each pixel LCD that is generated by summing the afterimage compensation data for each pixel GCD and the optical compensation data for each pixel CCD may be stored in the internal memory device 150.

Figure 2C:
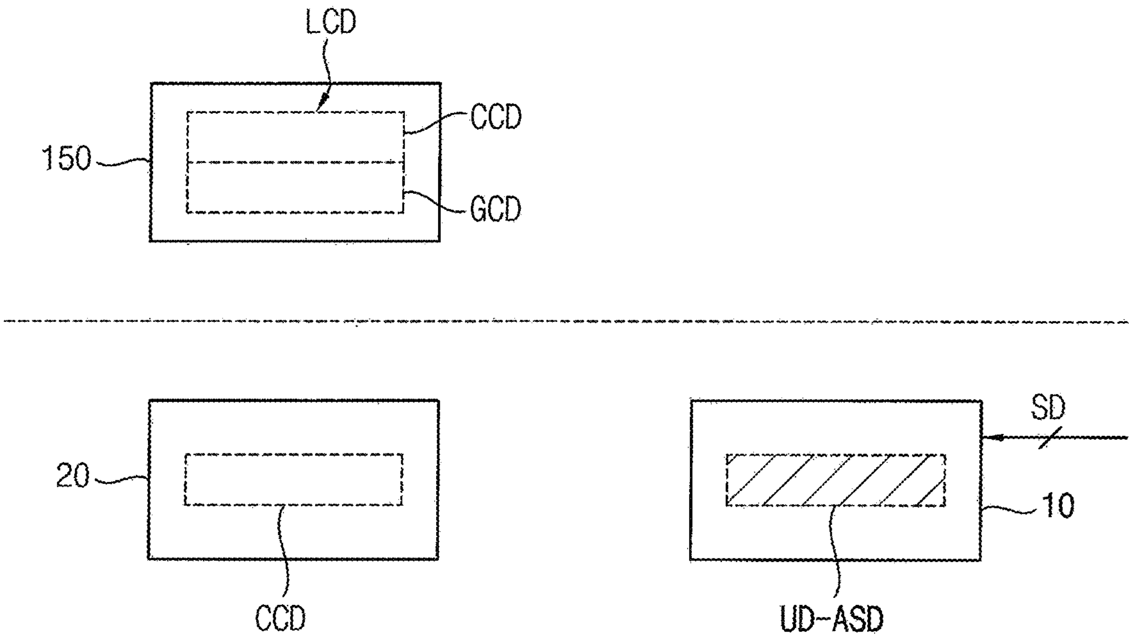

In such an embodiment, as illustrated in FIG. 2C, when the display device is in the turn-on state, the updated accumulated stress data for each pixel UD-ASD may be generated by updating the accumulated stress data for each pixel ASD in the first non-volatile memory device 10 (i.e., by accumulating the stress data for each pixel SD in the first non-volatile memory device 10). However, after the state of the display device is changed from the sleep state or the turn-off state to the turn-on state, the updated accumulated stress data for each pixel UD-ASD stored in the first non-volatile memory device 10 may not be read. Thus, when the display device is in the turn-on state, the luminance compensation data for each pixel LCD stored in the internal memory device 150 may not be affected by the updated accumulated stress data for each pixel UD-ASD although the updated accumulated stress data for each pixel UD-ASD exists in the first non-volatile memory device 10.

Figure 2D:
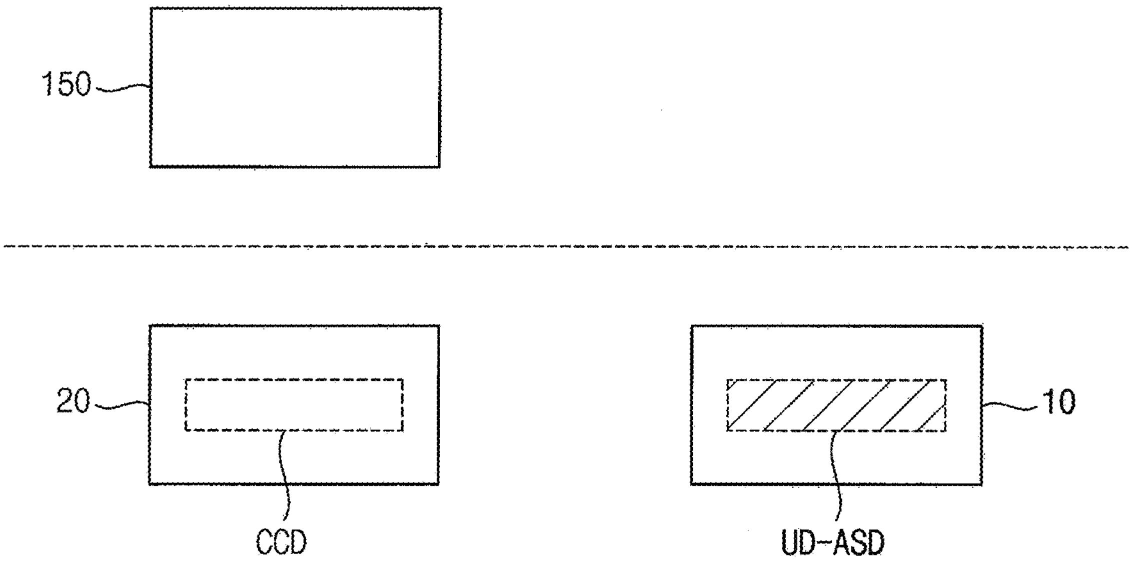

In such an embodiment, as illustrated in FIG. 2D, after the state of the display device is subsequently changed from the turn-on state to the sleep state or the turn-off state, the luminance compensation data for each pixel LCD stored in the internal memory device 150 may be lost because no power is supplied to the internal memory device 150. Thus, no data may be stored in the internal memory device 150. In such an embodiment, because the first and second non-volatile memory devices 10 and 20 can maintain data even when no power is supplied to the first and second non-volatile memory devices 10 and 20, the updated accumulated stress data for each pixel UD-ASD may be stored in the first non-volatile memory device 10, and the optical compensation data for each pixel CCD may be stored in the second non-volatile memory device 20.

Figure 2E:
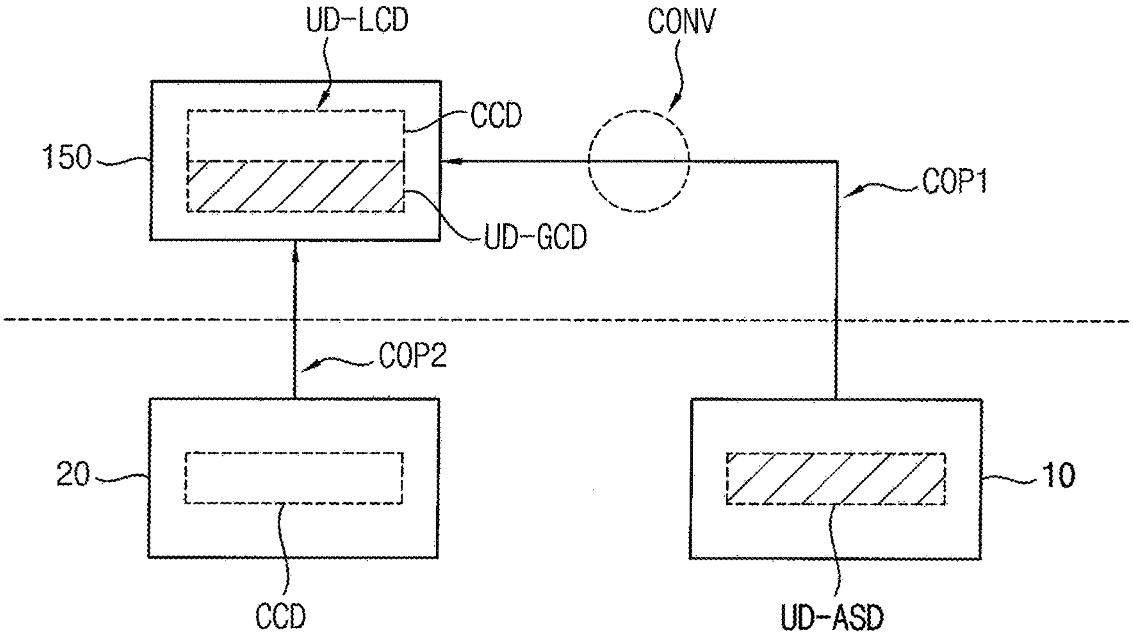

In such an embodiment, as illustrated in FIG. 2E, while the state of the display device is changed from the sleep state or the turn-off state to the turn-on state, the updated accumulated stress data for each pixel UD-ASD stored in the first non-volatile memory device 10 may be read (i.e., indicated by COP1), the updated accumulated stress data for each pixel UD-ASD may be converted into the updated afterimage compensation data for each pixel UD-GCD (i.e., indicated by CONY), the optical compensation data for each pixel CCD stored in the second non-volatile memory device 20 may be read (i.e., indicated by COP2), and then the updated luminance compensation data for each pixel UD-LCD that is generated by summing the updated afterimage compensation data for each pixel UD-GCD and the optical compensation data for each pixel CCD may be stored in the internal memory device 150.

Figure 3:
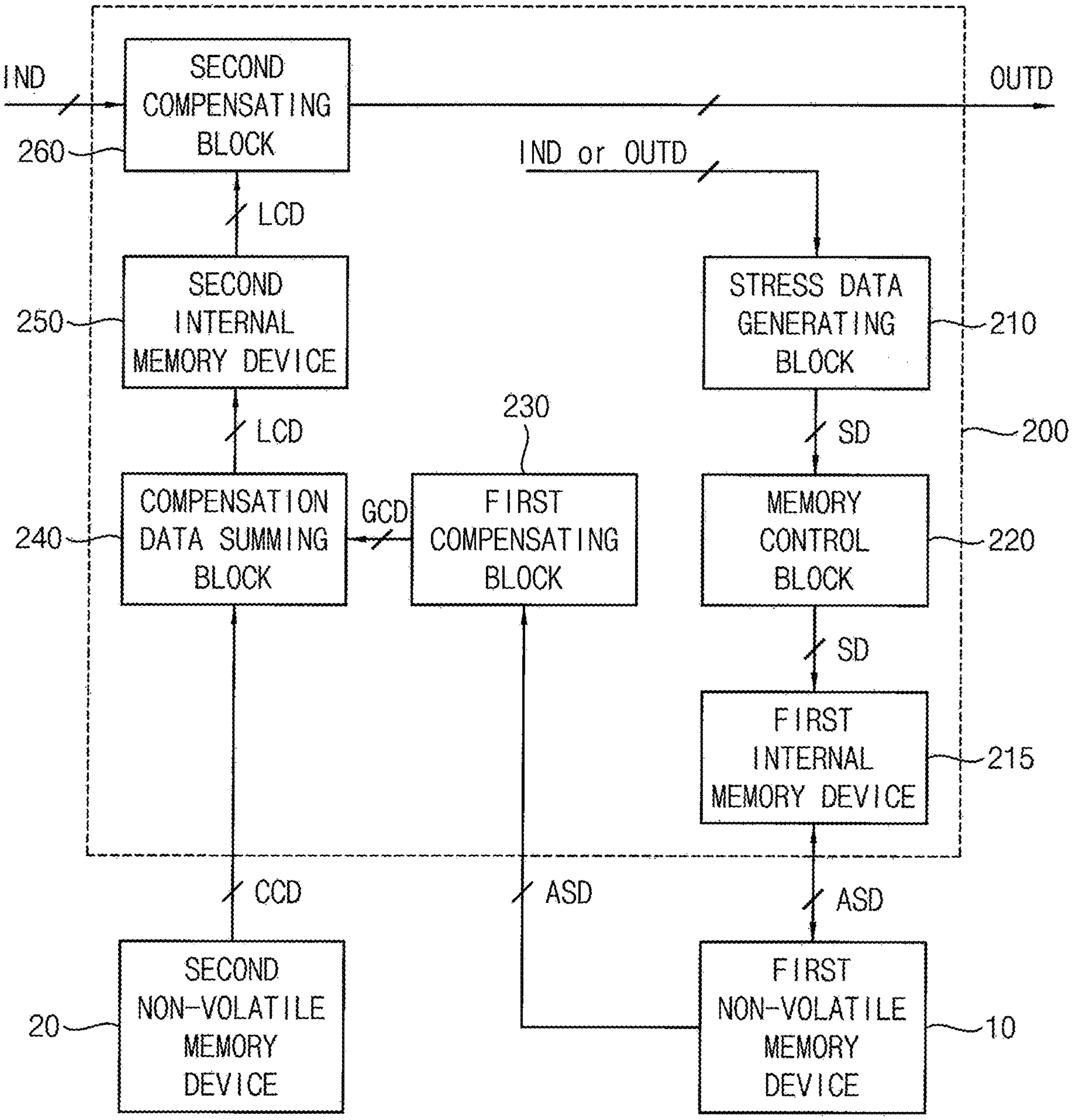
FIG. 3 is a block diagram illustrating a data compensating circuit according to an alternative embodiment.

FIG. 3 is a block diagram illustrating a data compensating circuit according to an alternative embodiment.

Referring to FIG. 3, an embodiment of the data compensating circuit 200 may include a stress data generating block 210, a first internal memory device 215, a memory control block 220, a first compensating block 230, a compensation data summing block 240, a second internal memory device 250, and a second compensating block 260. In such an embodiment, the data compensating circuit 200 may perform a data write operation and a data read operation on a first non-volatile memory device 10 that is located outside the data compensating circuit 200. In such an embodiment, the data compensating circuit 200 may perform a data read operation on a second non-volatile memory device 20 that is located outside the data compensating circuit 200 or may perform a data write operation and a data read operation on the second non-volatile memory device 20.

The stress data generating block 210 may generate stress data for each pixel SD based on input image data IND or output image data OUTD. In an embodiment, the stress data generating block 210 may generate the stress data for each pixel SD at a frame rate (or a display rate) (e.g., 60 Hz to 120 Hz). The first internal memory device 215 may operate at a higher speed than the first non-volatile memory device 10. In such an embodiment, the first internal memory device 215 may be a volatile memory device. In one embodiment, for example, the first internal memory device 215 may be implemented by a static random access memory device that operates at a relatively high speed. Thus, after a state of the display device is changed from a turn-on state to a sleep state or a turn-off state, data stored in the first internal memory device 215 may be lost. The memory control block 220 may move accumulated stress data for each pixel ASD stored in the first non-volatile memory device 10 into the first internal memory device 215 (that is, read accumulated stress data for each pixel ASD stored in the first non-volatile memory device 10 and store the read accumulated stress data for each pixel ASD into the first internal memory device 215) while the state of the display device is changed from the sleep state or the turn-off state to the turn-on state and may update the accumulated stress data for each pixel ASD by accumulating the stress data for each pixel SD in the first internal memory device 215 when the state of the display device is the turn-on state. After the state of the display device is changed from the sleep state or the turn-off state to the turn-on state, the memory control block may back up the accumulated stress data for each pixel ASD stored in the first internal memory device 215 to the first non-volatile memory device 10 at a predetermined cycle. In such an embodiment, since the memory control block 220 updates the accumulated stress data for each pixel ASD by accumulating the stress data for each pixel SD in the first internal memory device 215 when the display device is in the turn-on state, the memory control block 220 may synchronize data stored in the first non-volatile memory device 10 with data stored in the first internal memory device 215 at the predetermined cycle. The first non-volatile memory device 10 may maintain the accumulated stress data for each pixel ASD even when the display device is in the turn-off state. In an embodiment, the first non-volatile memory device 10 may be implemented by a flash memory device that operates at a relatively low speed.

The first compensating block 230 may read the accumulated stress data for each pixel ASD from the first non-volatile memory device 10 and may generate afterimage compensation data for each pixel GCD based on the accumulated stress data for each pixel ASD while the state of the display device is changed from the sleep state or the turn-off state to the turn-on state. In one embodiment, for example, the first compensating block 230 may generate the afterimage compensation data for each pixel GCD for performing the afterimage compensation by calculating a luminance drop amount for each pixel by applying the accumulated stress data for each pixel ASD to a predetermined deterioration curve and by calculating a luminance compensation amount for each pixel corresponding to the luminance drop amount for each pixel. In an embodiment, the first compensating block 230 may generate the afterimage compensation data for each pixel GCD by reading only a portion of the accumulated stress data for each pixel ASD from the first non-volatile memory device 10. In one embodiment, for example, the first compensating block 230 may generate the afterimage compensation data for each pixel GCD by reading only some most significant bits of the accumulated stress data for each pixel ASD from the first non-volatile memory device 10. In such an embodiment, the accumulated stress data for each pixel ASD may have a first size (e.g., 32-bit), a portion of the accumulated stress data for each pixel ASD which the first compensating block 230 reads from the first non-volatile memory device 10 may have a third size (e.g., 16-bit) that is smaller than the first size, and the afterimage compensation data for each pixel GCD may have the third size that is smaller than the first size. Because the first compensating block 230 reads the accumulated stress data for each pixel ASD from the first non-volatile memory device 10 that operates at a relatively low speed, it may take a relatively long time to generate the afterimage compensation data for each pixel GCD. However, in such an embodiment, the time is shorter than a time during which the state of the display device is changed from the sleep state or the turn-off state to the turn-on state, all of the afterimage compensation data for each pixel GCD for performing the afterimage compensation may be generated before the state of the display device is changed to the turn-on state.

The compensation data summing block 240 may read optical compensation data for each pixel CCD from a second non-volatile memory device 20 that is physically separate from the first non-volatile memory device 10 and may generate luminance compensation data for each pixel LCD by summing the afterimage compensation data for each pixel GCD received from the first compensating block 230 and the optical compensation data for each pixel CCD while the state of the display device is changed from the sleep state or the turn-off state to the turn-on state. In one embodiment, for example, the optical compensation data for each pixel CCD may include information on a luminance compensation amount for each pixel corresponding to the luminance drop amount for each pixel due to optical characteristic deviation in a manufacturing process of the display device. In an embodiment, the manufacturer of the display device may display a test image on a display panel in the manufacturing process of the display device, may generate a luminance image by optically capturing the test image, may generate the optical compensation data for each pixel CCD for compensating for the optical characteristic deviation by analyzing the luminance image, and may store the optical compensation data for each pixel CCD in the second non-volatile memory device 20 included in the display device. In one embodiment, for example, the optical compensation data for each pixel CCD may have a second size (e.g., 8-bit) that is smaller than the first size (e.g., 32-bit) of the accumulated stress data for each pixel ASD. In such an embodiment, the second non-volatile memory device 20 may maintain the optical compensation data for each pixel CCD even when the display device is in the turn-off state. In an embodiment, the second non-volatile memory device 20 may be implemented by a flash memory device that operates at a relatively low speed. In an embodiment, the optical compensation data for each pixel CCD stored in the second non-volatile memory device 20 may not be updated. In such an embodiment, the optical compensation data for each pixel CCD stored in the second non-volatile memory device 20 may have a fixed value. In an alternative embodiment, the optical compensation data for each pixel CCD stored in the second non-volatile memory device 20 may be updated by the manufacturer or a user of the display device. In such an embodiment, as described above, the luminance compensation data for each pixel LCD is generated by summing the afterimage compensation data for each pixel GCD for performing the afterimage compensation and the optical compensation data for each pixel CCD for performing the optical compensation, such that the afterimage compensation and the optical compensation may be simultaneously performed on the input image data IND when the input image data IND is compensated for based on the luminance compensation data for each pixel LCD.

The second internal memory device 250 may store the luminance compensation data for each pixel LCD that is generated by summing the afterimage compensation data for each pixel GCD for performing the afterimage compensation and the optical compensation data for each pixel CCD for performing the optical compensation. In an embodiment, the second internal memory device 250 may be a volatile memory device. In one embodiment, for example, the second internal memory device 250 may be implemented by a static random access memory device that operates at a relatively high speed. Thus, after the state of the display device is changed from the turn-on state to the sleep state or the turn-off state, the luminance compensation data for each pixel LCD stored in the second internal memory device 250 may be lost. In such an embodiment, after the luminance compensation data for each pixel LCD is stored in the second internal memory device 250 as the state of the display device is changed from the sleep state or the turn-off state to the turn-on state, the first compensating block 230 may not read the accumulated stress data for each pixel ASD from the first non-volatile memory device 10 and thus may not generate the afterimage compensation data for each pixel GCD based on the accumulated stress data for each pixel ASD. Thus, after the luminance compensation data for each pixel LCD is stored in the second internal memory device 250 as the state of the display device is changed from the sleep state or the turn-off state to the turn-on state, the luminance compensation data for each pixel LCD stored in the second internal memory device 250 may not be changed even when the memory control block 220 updates the accumulated stress data for each pixel ASD by accumulating the stress data for each pixel SD in the first internal memory device 215 in real-time and backs up the updated accumulated stress data for each pixel ASD to the first non-volatile memory device 10. Accordingly, in such an embodiment, the luminance compensation data for each pixel LCD stored in the second internal memory device 250 may not be affected by updates of the accumulated stress data for each pixel ASD when the display device is in the turn-on state. When the display device is in the turn-on state, the updates of the accumulated stress data for each pixel ASD may not be reflected on the luminance compensation data for each pixel LCD stored in the second internal memory device 250. In such an embodiment, deterioration of pixels included in the display panel proceeds slowly, image quality degradation due to the existing (or non-updated) accumulated stress data for each pixel ASD (that is, the accumulated stress data for each pixel ASD stored in the internal memory device 150 before the updates) may not be substantially or recognizable. After the state of the display device is changed from the turn-on state to the sleep state or the turn-off state, the luminance compensation data for each pixel LCD stored in the second internal memory device 250 may be lost. In such an embodiment, as the state of the display device is subsequently changed from the sleep state or the turn-off state to the turn-on state, the updated luminance compensation data for each pixel LCD that is generated by reflecting the updated afterimage compensation data for each pixel GCD corresponding to the updated accumulated stress data for each pixel ASD stored in the first non-volatile memory device 10 may be stored in the second internal memory device 250.

The second compensating block 260 may generate the output image data OUTD (i.e., compensated input image data that is generated by performing both the afterimage compensation and the optical compensation) by compensating for the input image data IND based on the luminance compensation data for each pixel LCD. In such an embodiment, the luminance compensation data for each pixel LCD includes the afterimage compensation data for each pixel GCD for performing the afterimage compensation and the optical compensation data for each pixel CCD for performing the optical compensation, such that the second compensating block 260 may simultaneously perform the afterimage compensation and the optical compensation on the input image data IND by simply compensating for the input image data IND based on the luminance compensation data for each pixel LCD. In such an embodiment, the data compensating circuit 200 may allow the display device to simultaneously perform the afterimage compensation and the optical compensation so as to efficiently use memory devices included in the display device (e.g., reducing the number, capacity, etc. of the memory devices included in the display device) by including the stress data generating block 210 that generates the stress data for each pixel SD based on the input image data IND or the output image data OUTD, the first internal memory device 215 that operates at a higher speed than the first non-volatile memory device 10, the memory control block 220 that moves the accumulated stress data for each pixel ASD stored in the first non-volatile memory device 10 into the first internal memory device 215 while the state of the display device is changed from the sleep state or the turn-off state to the turn-on state and updates the accumulated stress data for each pixel ASD by accumulating the stress data for each pixel SD in the first internal memory device 215 when the state of the display device is the turn-on state, the first compensating block 230 that reads the accumulated stress data for each pixel ASD from the first non-volatile memory device 10 and generates the afterimage compensation data for each pixel GCD based on the accumulated stress data for each pixel ASD while the state of the display device is changed from the sleep state or the turn-off state to the turn-on state, the compensation data summing block 240 that reads the optical compensation data for each pixel CCD from the second non-volatile memory device 20 that is physically separate from the first non-volatile memory device 10 and generates the luminance compensation data for each pixel LCD by summing the afterimage compensation data for each pixel GCD and the optical compensation data for each pixel CCD while the state of the display device is changed from the sleep state or the turn-off state to the turn-on state, the second internal memory device 250 that stores the luminance compensation data for each pixel LCD, and the second compensating block 260 that generates the output image data OUTD by compensating for the input image data IND based on the luminance compensation data for each pixel LCD.

FIGS. 4A to 4F are diagrams illustrating a process in which the data compensation circuit of FIG. 3 uploads luminance compensation data for each pixel to an internal memory device.

FIGS. 4A to 4F show a process in which the accumulated stress data for each pixel ASD is stored, updated, and lost in the first internal memory device 215 included in the data compensating circuit 200 and then the updated accumulated stress data for each pixel UD-ASD is stored in the first internal memory device 215 included in the data compensating circuit 200. FIGS. 4A to 4F further show that the luminance compensation data for each pixel LCD is stored in the second internal memory device 250 included in the data compensating circuit 200, the luminance compensation data for each pixel LCD is lost in the second internal memory device 250 included in the data compensating circuit 200, and then the updated luminance compensation data for each pixel UD-LCD is stored in the second internal memory device 250 included in the data compensating circuit 200.

Figure 4A:
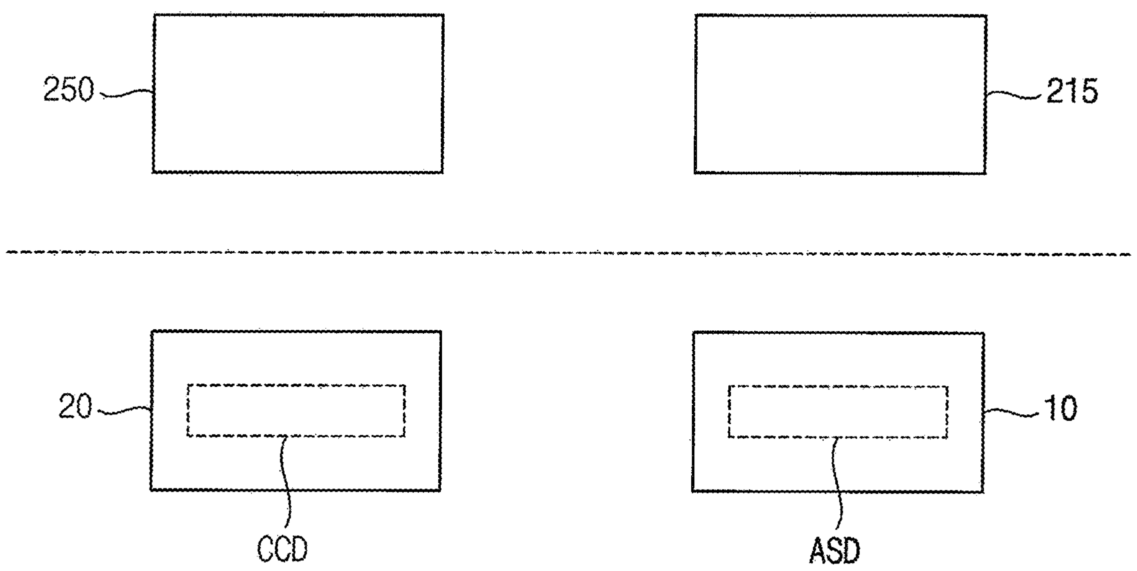
FIGS. 4A to 4F are diagrams illustrating a process in which the data compensation circuit of FIG. 3 uploads luminance compensation data for each pixel to an internal memory device.

In an embodiment, as illustrated in FIG. 4A, when the display device is in the sleep state or the turn-off state, the accumulated stress data for each pixel ASD may be stored in the first non-volatile memory device 10, and the optical compensation data for each pixel CCD may be stored in the second non-volatile memory device 20. In such an embodiment, since power is not supplied to the first internal memory device 215 when the display device is in the sleep state or the turn-off state, no data may be stored in the first internal memory device 215 since a previous accumulated stress data for each pixel ASD stored in the first internal memory device 215 that is implemented by the volatile memory device (e.g., the static random access memory device, etc.) has been lost. In such an embodiment, since power is not supplied to the second internal memory device 250 when the display device is in the sleep state or the turn-off state, no data may be stored in the second internal memory device 250 since a previous luminance compensation data for each pixel LCD stored in the second internal memory device 250 that is implemented by the volatile memory device (e.g., the static random access memory device, etc.) has been lost.

Figure 4B:
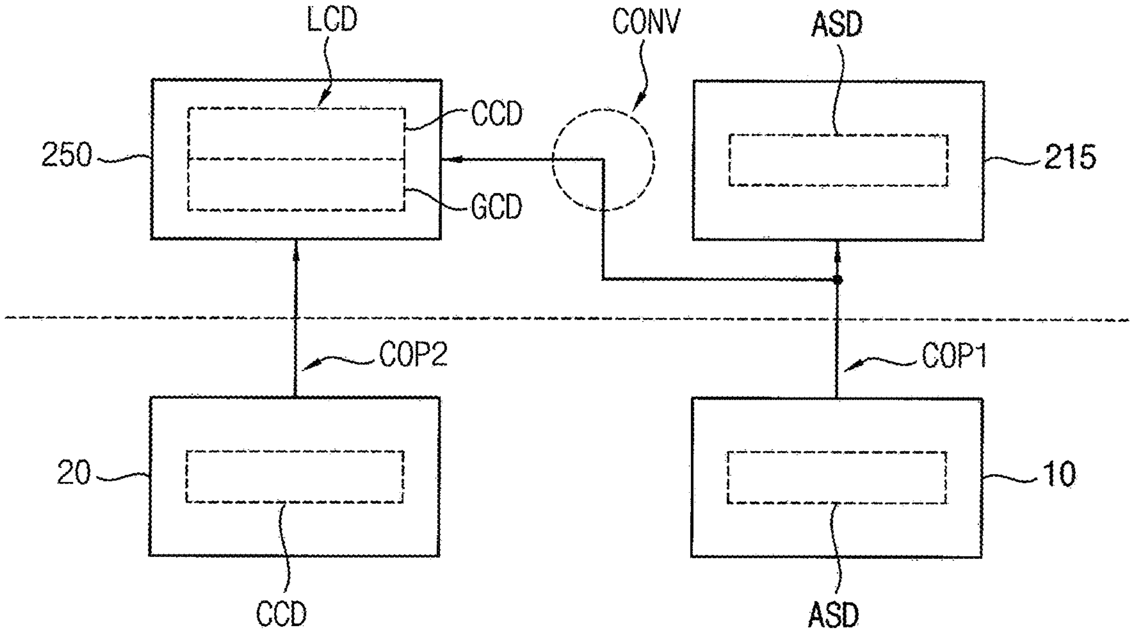

In such an embodiment, as illustrated in FIG. 4B, while the state of the display device is changed from the sleep state or the turn-off state to the turn-on state, the accumulated stress data for each pixel ASD stored in the first non-volatile memory device 10 may be read (i.e., indicated by COP1) to be stored in the first internal memory device 215. In such an embodiment, while the state of the display device is changed from the sleep state or the turn-off state to the turn-on state, the accumulated stress data for each pixel ASD stored in the first non-volatile memory device 10 may be read (i.e., indicated by COP1), the accumulated stress data for each pixel ASD may be converted into the afterimage compensation data for each pixel GCD (i.e., indicated by CONV), the optical compensation data for each pixel CCD stored in the second non-volatile memory device 20 may be read (i.e., indicated by COP2), and then the luminance compensation data for each pixel LCD that is generated by summing the afterimage compensation data for each pixel GCD and the optical compensation data for each pixel CCD may be stored in the second internal memory device 250.

Figure 4C:
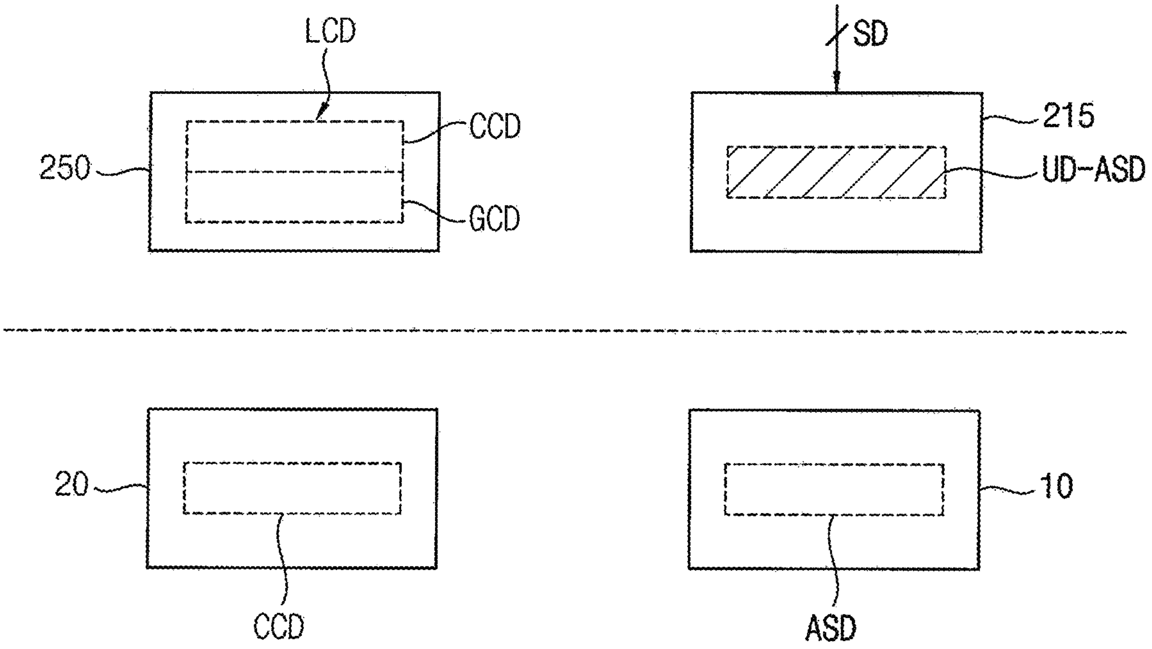
Figure 4D:
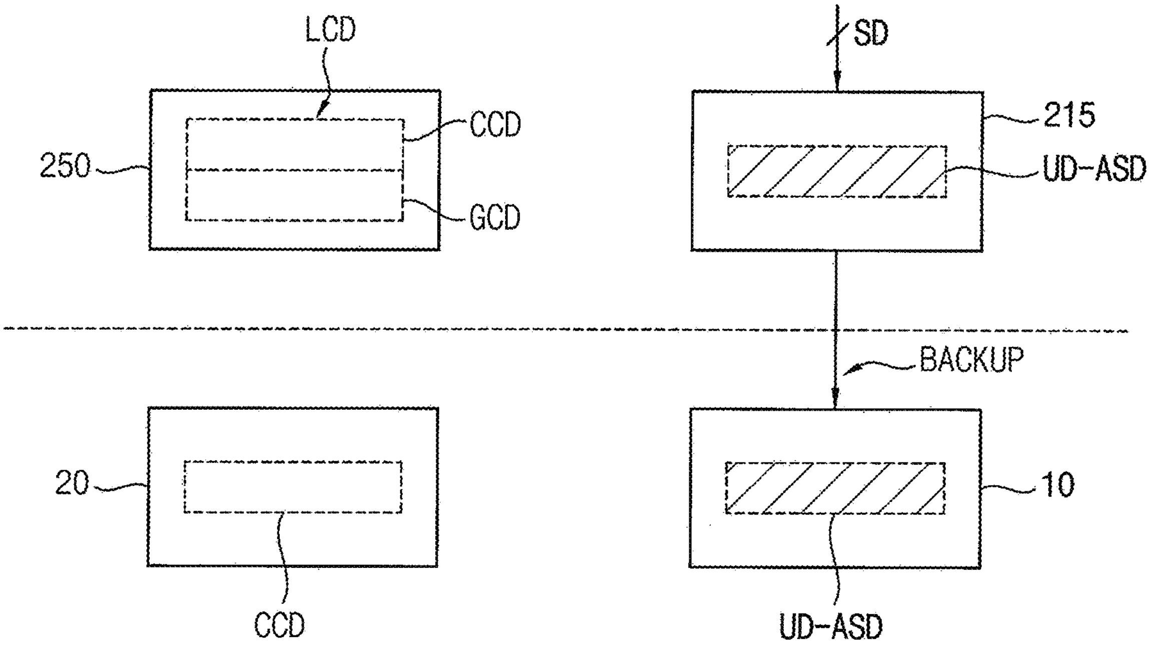

In such an embodiment, as illustrated in FIG. 4C, when the display device is in the turn-on state, the updated accumulated stress data for each pixel UD-ASD may be generated by updating the accumulated stress data for each pixel ASD in the first internal memory device 215 (i.e., by accumulating the stress data for each pixel SD in the first internal memory device 215). In such an embodiment, as illustrated in FIG. 4D, when the display device is in the turn-on state, the updated accumulated stress data for each pixel UD-ASD stored in the first internal memory device 215 may be backed up to the first non-volatile memory device 10 at a predetermined cycle (i.e., indicated by BACKUP). However, after the state of the display device is changed from the sleep state or the turn-off state to the turn-on state, the updated accumulated stress data for each pixel UD-ASD stored in the first non-volatile memory device 10 may not be read. Thus, when the display device is in the turn-on state, the luminance compensation data for each pixel LCD stored in the second internal memory device 250 may not be affected by the updated accumulated stress data for each pixel UD-ASD although the updated accumulated stress data for each pixel UD-ASD exists in the first non-volatile memory device 10.

Figure 4E:
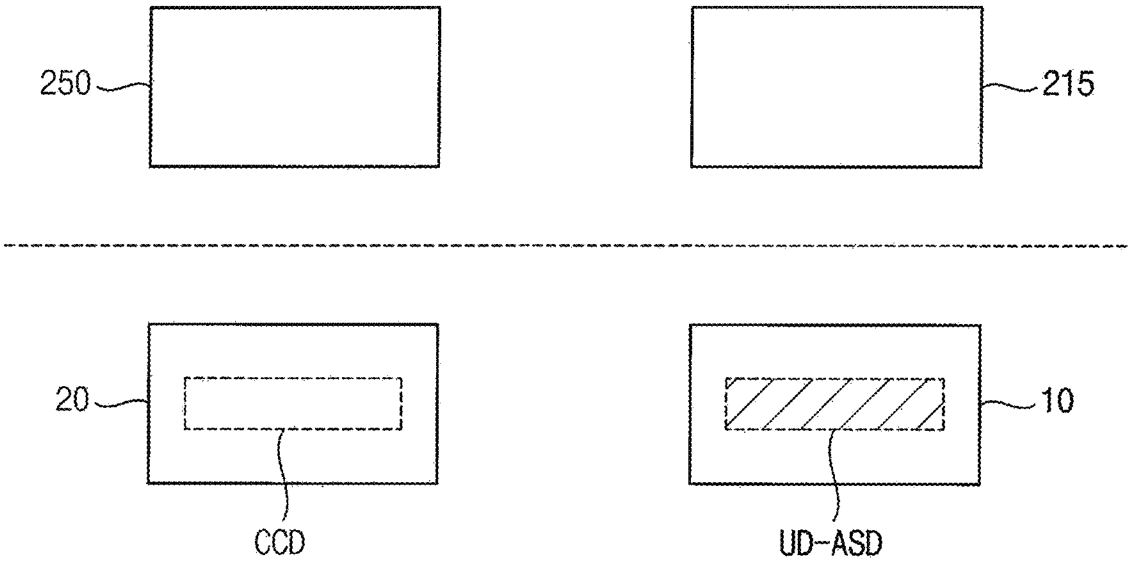

In such an embodiment, as illustrated in FIG. 4E, after the state of the display device is changed from the turn-on state to the sleep state or the turn-off state, the accumulated stress data for each pixel ASD stored in the first internal memory device 215 may be lost because no power is supplied to the first internal memory device 215. In such an embodiment, after the state of the display device is changed from the turn-on state to the sleep state or the turn-off state, the luminance compensation data for each pixel LCD stored in the second internal memory device 250 may be lost because no power is supplied to the second internal memory device 250. Thus, no data may be stored in the first internal memory device 215 and the second internal memory device 250. In such an embodiment, because the first and second non-volatile memory devices 10 and 20 can maintain data even when no power is supplied to the first and second non-volatile memory devices 10 and 20, the updated accumulated stress data for each pixel UD-ASD may be stored in the first non-volatile memory device 10, and the optical compensation data for each pixel CCD may be stored in the second non-volatile memory device 20.

Figure 4F:
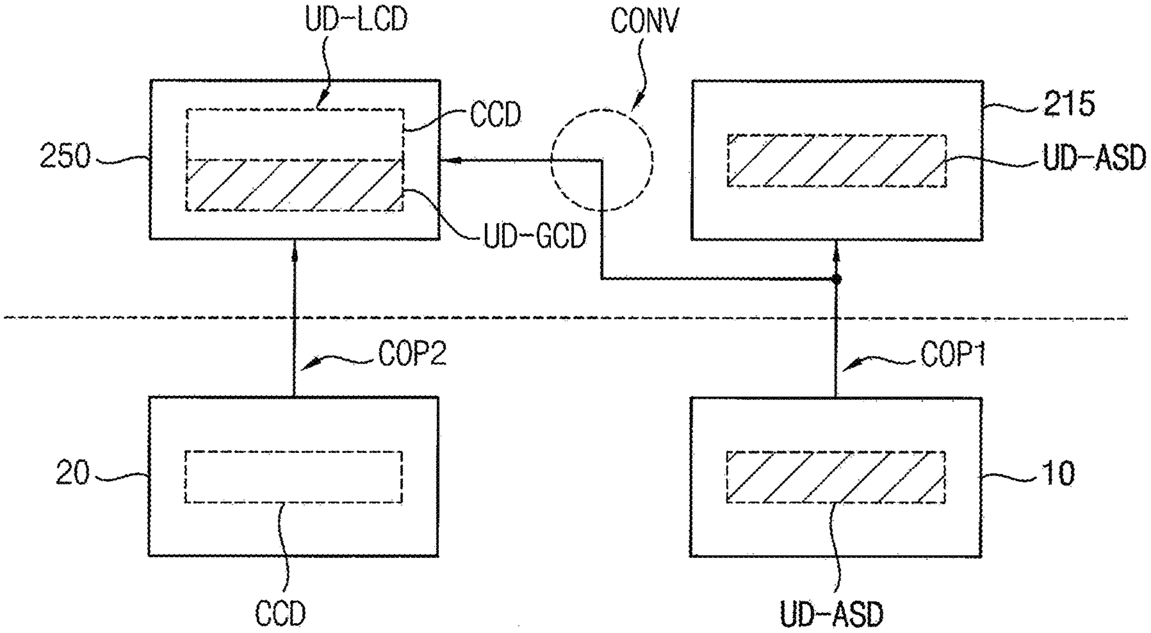

In such an embodiment, as illustrated in FIG. 4F, while the state of the display device is changed from the sleep state or the turn-off state to the turn-on state, the updated accumulated stress data for each pixel UD-ASD stored in the first non-volatile memory device 10 may be read (i.e., indicated by COP1) to be stored in the first internal memory device 215. In such an embodiment, while the state of the display device is changed from the sleep state or the turn-off state to the turn-on state, the updated accumulated stress data for each pixel UD-ASD stored in the first non-volatile memory device 10 may be read (i.e., indicated by COP1), the updated accumulated stress data for each pixel UD-ASD may be converted into the updated afterimage compensation data for each pixel UD-GCD (i.e., indicated by CONV), the optical compensation data for each pixel CCD stored in the second non-volatile memory device 20 may be read (i.e., indicated by COP2), and then the updated luminance compensation data for each pixel UD-LCD that is generated by summing the updated afterimage compensation data for each pixel UD-GCD and the optical compensation data for each pixel CCD may be stored in the second internal memory device 250.

Figure 5:
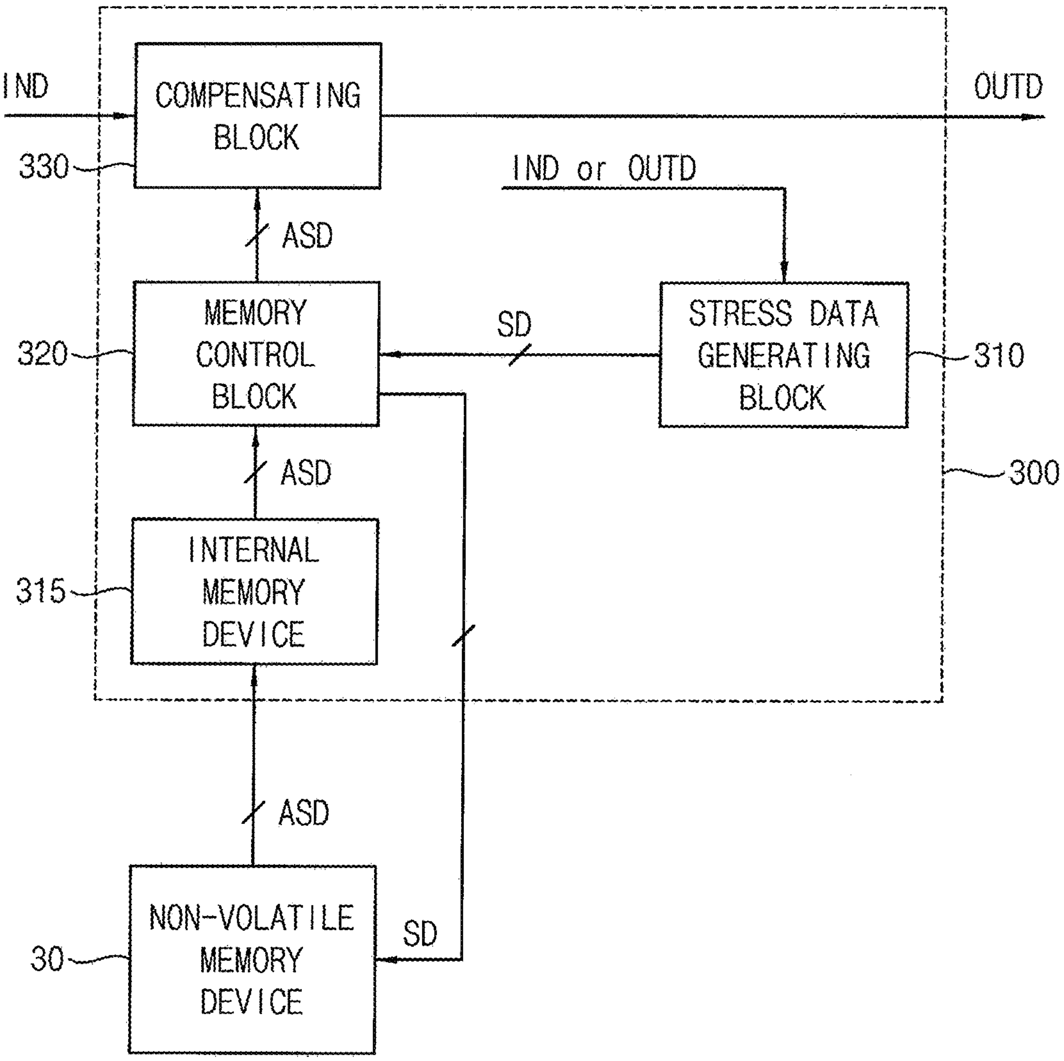
FIG. 5 is a block diagram illustrating a data compensating circuit according to another alternative embodiment.

FIG. 5 is a block diagram illustrating a data compensating circuit according to another alternative embodiment.

Referring to FIG. 5, an embodiment of the data compensating circuit 300 may include a stress data generating block 310, an internal memory device 315, a memory control block 320, and a compensating block 330. In such an embodiment, the data compensating circuit 300 may perform a data write operation and a data read operation on a non-volatile memory device 30 that is located outside the data compensating circuit 300.

The stress data generating block 310 may generate stress data for each pixel SD based on input image data IND or output image data OUTD. In an embodiment, the stress data generating block 310 may generate the stress data for each pixel SD at a frame rate (or a display rate) (e.g., 60 Hz to 120 Hz). The internal memory device 315 may operate at a higher speed than the non-volatile memory device 30. Here, the internal memory device 315 may be a volatile memory device. In one embodiment, for example, the internal memory device 315 may be implemented by a static random access memory device that operates at a relatively high speed. Thus, after a state of the display device is changed from a turn-on state to a sleep state or a turn-off state, data (i.e., a portion of accumulated stress data for each pixel ASD) stored in the internal memory device 315 may be lost.

The memory control block 320 may read the accumulated stress data for each pixel ASD stored in the non-volatile memory device 30 and may store the accumulated stress data for each pixel ASD in the internal memory device 315 while the state of the display device is changed from the sleep state or the turn-off state to the turn-on state. In an embodiment, the memory control block 320 may read only a portion of the accumulated stress data for each pixel ASD stored in the non-volatile memory device 30 and may store the portion of the accumulated stress data for each pixel ASD in the internal memory device 315. In one embodiment, for example, the memory control block 320 may read only some most significant bits of the accumulated stress data for each pixel ASD from the non-volatile memory device 30 and may store them in the internal memory device 315. That is, the internal memory device 315 may store only minimum data to perform afterimage compensation (i.e., the portion of the accumulated stress data for each pixel ASD). In one embodiment, for example, the accumulated stress data for each pixel ASD may have a first size (e.g., 32-bit), and a portion of the accumulated stress data for each pixel ASD (e.g., some most significant bits) which is read from the non-volatile memory device 30 may have a third size (e.g., 16-bit) that is smaller than the first size. In addition, the memory control block 320 may update the accumulated stress data for each pixel ASD by accumulating the stress data for each pixel SD in the non-volatile memory device 30 when the display device is in the turn-on state. In an embodiment, the memory control block 320 may accumulate the stress data for each pixel SD in the non-volatile memory device 30 at an accumulative rate (e.g., less than 1 Hz) corresponding to an operating speed of the non-volatile memory device 30. The non-volatile memory device 30 may maintain the accumulated stress data for each pixel ASD even when the display device is in the turn-off state. In an embodiment, the non-volatile memory device 30 may be implemented by a flash memory device that operates at a relatively low speed.

In embodiments, after the accumulated stress data for each pixel ASD is stored in the internal memory device 315 as the state of the display device is changed from the sleep state or the turn-off state to the turn-on state, the memory control block 320 may not move the accumulated stress data for each pixel ASD from the non-volatile memory device 30 to the internal memory device 315. Thus, after the accumulated stress data for each pixel ASD is stored in the internal memory device 315 as the state of the display device is changed from the sleep state or the turn-off state to the turn-on state, the accumulated stress data for each pixel ASD stored in the internal memory device 315 may not be updated even when the memory control block 320 updates the accumulated stress data for each pixel ASD by accumulating the stress data for each pixel SD in the non-volatile memory device 30 in real-time. That is, when the display device is in the turn-on state, the accumulated stress data for each pixel ASD stored in the internal memory device 315 may not be updated. However, because deterioration of pixels included in a display panel of the display device proceeds slowly, image quality degradation due to non-reflection of the updates of the accumulated stress data for each pixel ASD may not be significant. After the state of the display device is changed from the turn-on state to the sleep state or the turn-off state, the accumulated stress data for each pixel ASD stored in the internal memory device 315 may be lost. In such an embodiment, while the state of the display device is changed from the sleep state or the turn-off state to the turn-on state, the updated accumulated stress data for each pixel ASD stored in the non-volatile memory device 30 may be stored in the internal memory device 315.

The compensating block 330 may generate the output image data OUTD (i.e., compensated input image data that is generated by performing afterimage compensation) by reading the accumulated stress data for each pixel ASD from the internal memory device 315, by generating afterimage compensation data for each pixel GCD based on the accumulated stress data for each pixel ASD, and by compensating for the input image data IND based on the afterimage compensation data for each pixel GCD. In one embodiment, for example, the compensating block 330 may generate the output image data OUTD by calculating a luminance drop amount for each pixel by applying the accumulated stress data for each pixel ASD to a predetermined deterioration curve, by calculating a luminance compensation amount for each pixel corresponding to the luminance drop amount for each pixel, by generating the afterimage compensation data for each pixel GCD corresponding to the luminance compensation amount for each pixel, and by compensating for the input image data IND based on the afterimage compensation data for each pixel GCD. In such an embodiment, the data compensating circuit 300 may include a memory device for afterimage compensation (i.e., the internal memory device 315) and may use the memory device to perform the afterimage compensation. In such an embodiment, the data compensating circuit 300 may use an external memory device for data accumulation (i.e., the non-volatile memory device 30) to update the accumulated stress data for each pixel ASD by accumulating the stress data for each pixel SD. As a result, the data compensating circuit 300 may allow the display device to efficiently use memory devices included in the display device (e.g., reducing the number, capacity, etc. of the memory devices included in the display device).

FIGS. 6A to 6E are diagrams illustrating a process in which the data compensation circuit of FIG. 5 uploads luminance compensation data for each pixel to an internal memory device.

FIGS. 6A to 6E show a process in which the accumulated stress data for each pixel ASD is stored in the internal memory device 315 included in the data compensating circuit 300, the accumulated stress data for each pixel ASD is lost in the internal memory device 315 included in the data compensating circuit 300, and then the updated accumulated stress data for each pixel UD-ASD is stored in the internal memory device 315 included in the data compensating circuit 300.

Figure 6A:
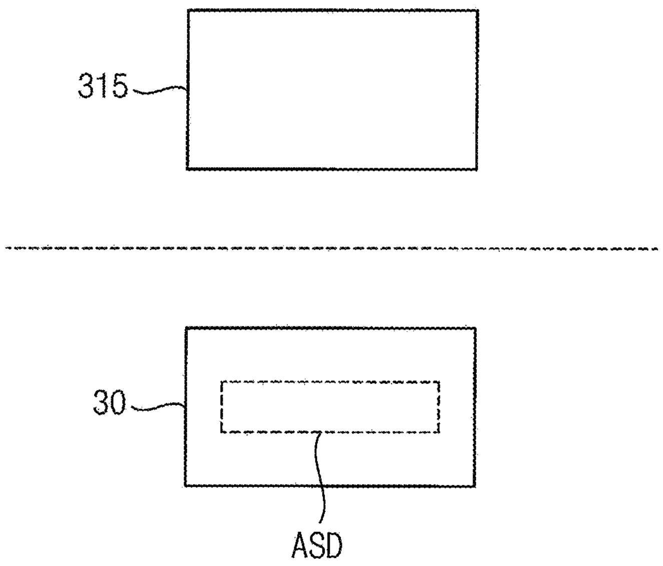
FIGS. 6A to 6E are diagrams illustrating a process in which the data compensation circuit of FIG. 5 uploads luminance compensation data for each pixel to an internal memory device.

In such an embodiment, as illustrated in FIG. 6A, when the display device is in the sleep state or the turn-off state, the accumulated stress data for each pixel ASD may be stored in the non-volatile memory device 30. In such an embodiment, since power is not supplied to the internal memory device 315 when the display device is in the sleep state or the turn-off state, no data may be stored in the internal memory device 315 since a previous accumulated stress data for each pixel ASD stored in the internal memory device 315 that is implemented by the volatile memory device (e.g., the static random access memory device, etc.) has been lost.

Figure 6B:
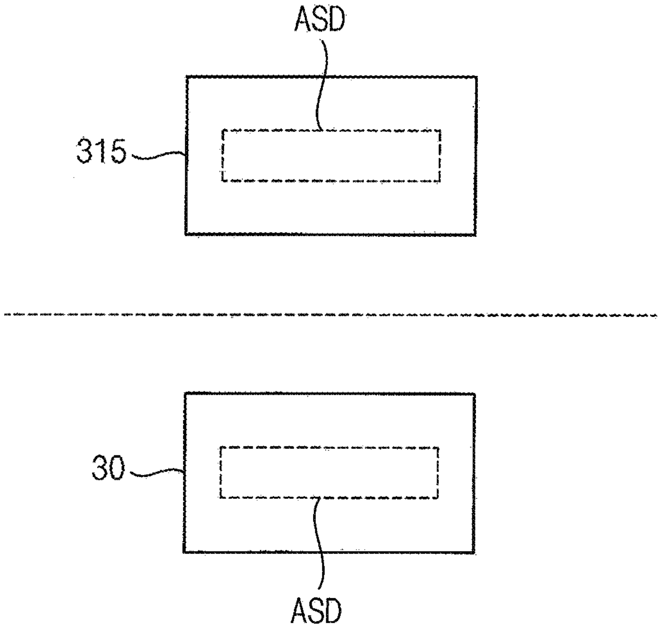

In such an embodiment, as illustrated in FIG. 6B, while the state of the display device is changed from the sleep state or the turn-off state to the turn-on state, the accumulated stress data for each pixel ASD stored in the non-volatile memory device 30 may be read (i.e., indicated by COP) to be stored in the internal memory device 315. In an embodiment, only the minimum data to perform the afterimage compensation (i.e., a portion of the accumulated stress data for each pixel ASD) may be stored in the internal memory device 315. In one embodiment, for example, only some most significant bits of the accumulated stress data for each pixel ASD may be read from the non-volatile memory device 30 to be stored in the internal memory device 315.

Figure 6C:
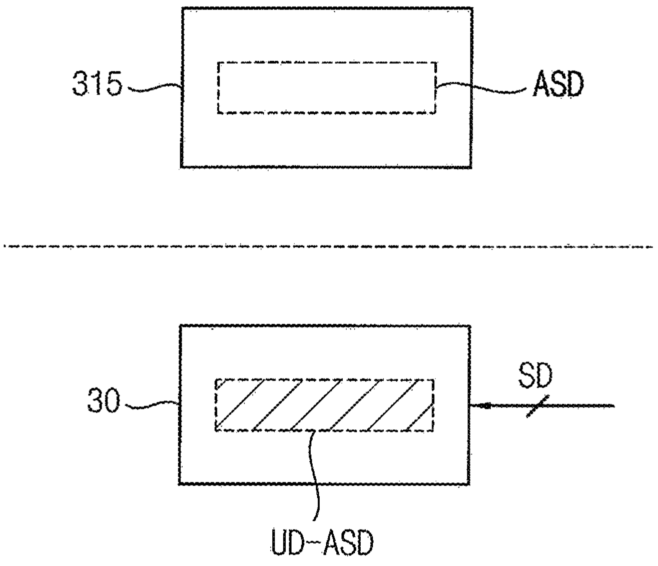

In such an embodiment, as illustrated in FIG. 6C, when the display device is in the turn-on state, the updated accumulated stress data for each pixel UD-ASD may be generated by updating the accumulated stress data for each pixel ASD in the non-volatile memory device 30 (i.e., by accumulating the stress data for each pixel SD in the non-volatile memory device 30). In such an embodiment, after the state of the display device is changed from the sleep state or the turn-off state to the turn-on state, the updated accumulated stress data for each pixel UD-ASD stored in the non-volatile memory device 30 may not be read. Thus, when the display device is in the turn-on state, the accumulated stress data for each pixel ASD stored in the internal memory device 315 may not be affected by the updated accumulated stress data for each pixel UD-ASD although the updated accumulated stress data for each pixel UD-ASD exists in the non-volatile memory device 30.

Figure 6D:
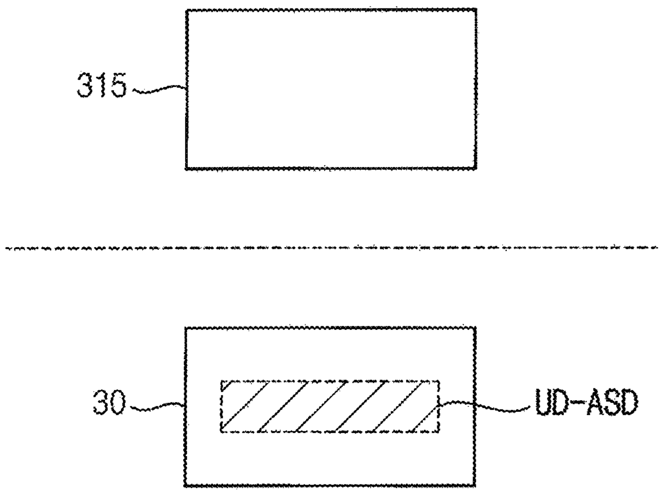

In such an embodiment, as illustrated in FIG. 6D, after the state of the display device is changed from the turn-on state to the sleep state or the turn-off state, the accumulated stress data for each pixel ASD stored in the internal memory device 315 may be lost because no power is supplied to the internal memory device 315. Thus, no data may be stored in the internal memory device 315. In such an embodiment, because the non-volatile memory device 30 can maintain data even when no power is supplied to the non-volatile memory device 30, the updated accumulated stress data for each pixel UD-ASD may be stored in the non-volatile memory device 30.

Figure 6E:
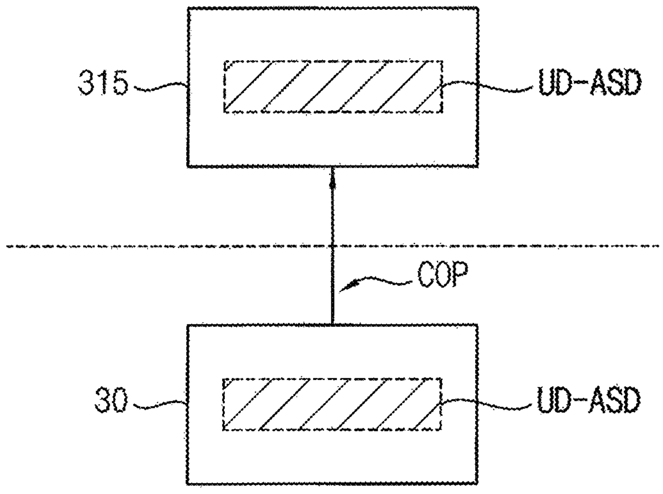

In such an embodiment, as illustrated in FIG. 6E, while the state of the display device is subsequently changed from the sleep state or the turn-off state to the turn-on state, the updated accumulated stress data for each pixel UD-ASD stored in the non-volatile memory device 30 may be read (i.e., indicated by COP) to be stored in the internal memory device 315. In an embodiment, only the minimum data to perform the afterimage compensation (i.e., a portion of the updated accumulated stress data for each pixel UD-ASD) may be stored in the internal memory device 315. In one embodiment, for example, only some most significant bits of the updated accumulated stress data for each pixel UD-ASD may be read from the non-volatile memory device 30 to be stored in the internal memory device 315.

Figure 7:
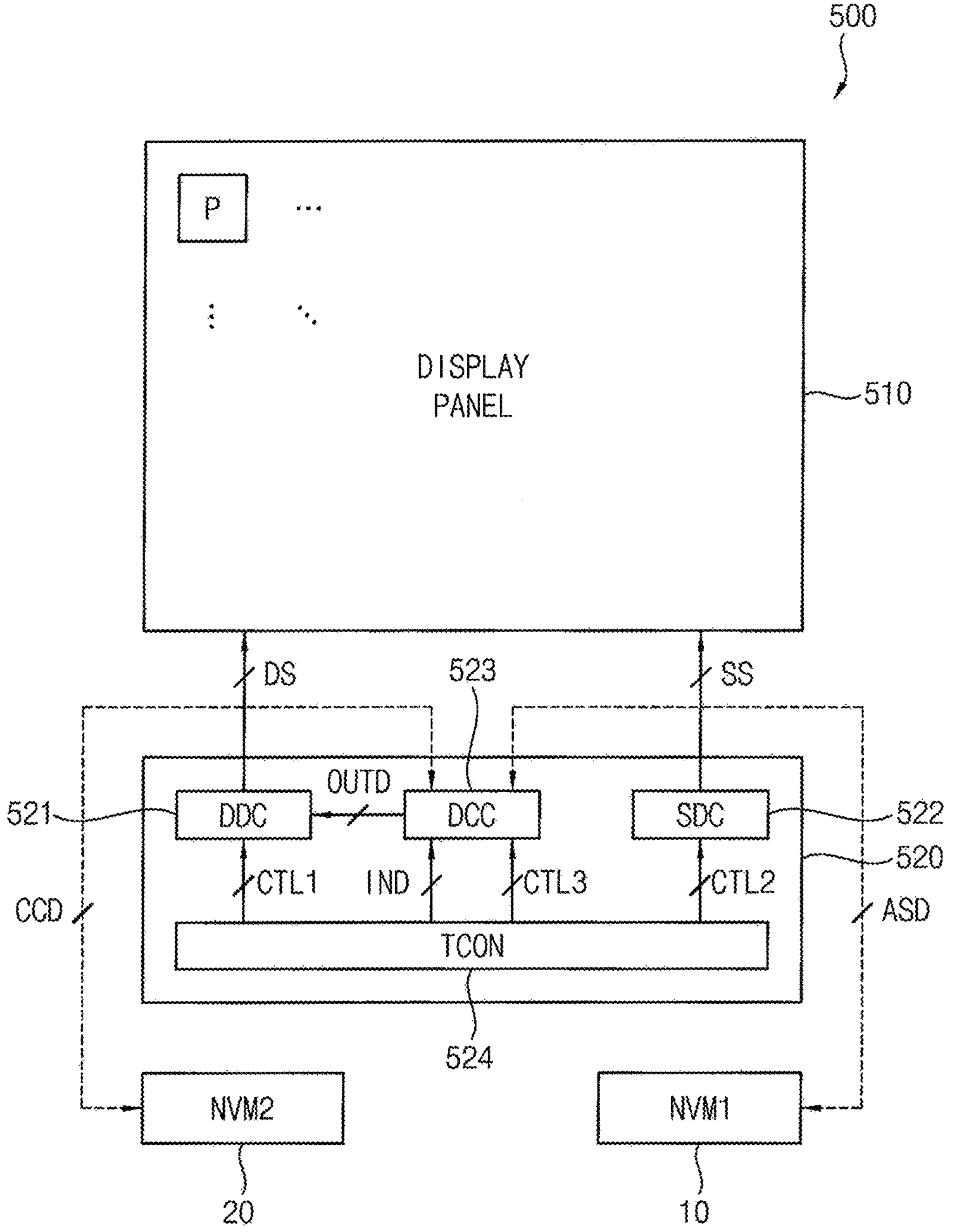
FIG. 7 is a block diagram illustrating a display device according to an embodiment.
Figure 8:
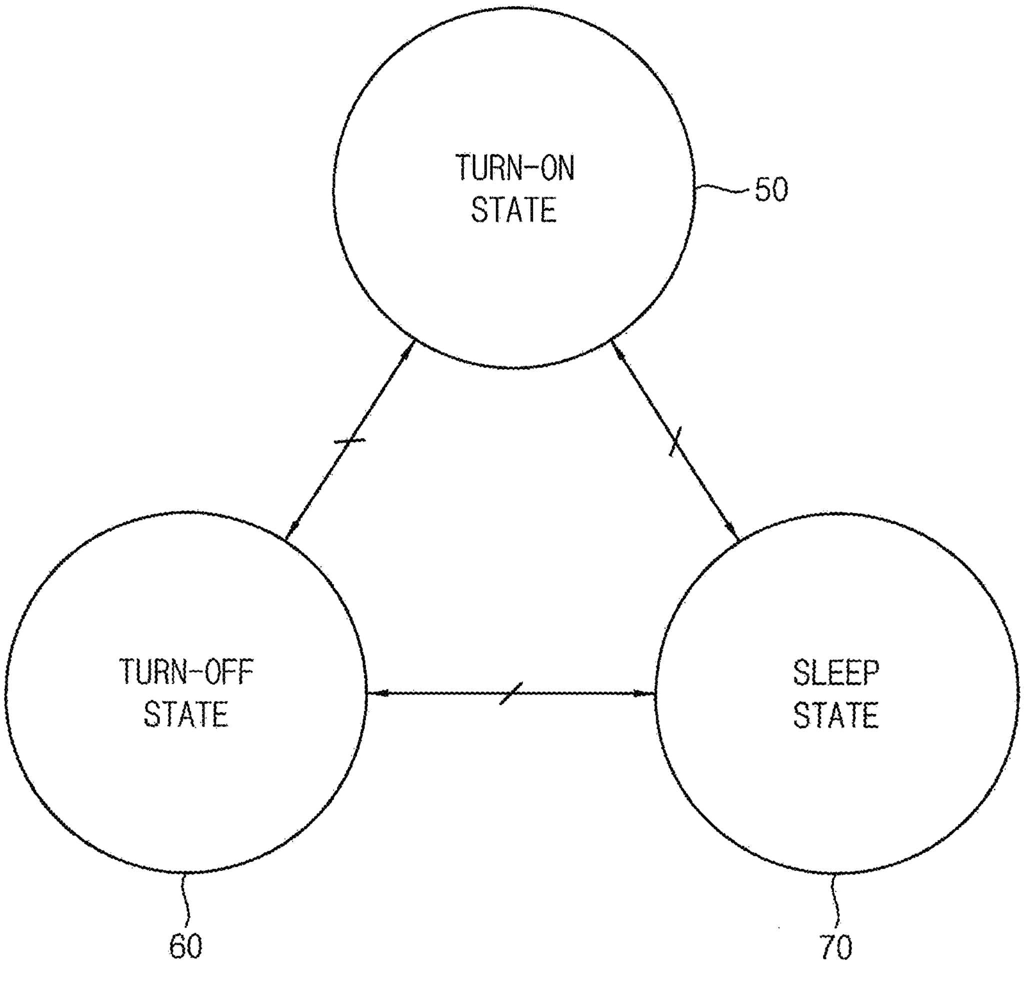
FIG. 8 is a diagram illustrating a state (i.e., an operating state) of the display device of FIG. 7.

FIG. 7 is a block diagram illustrating a display device according to an embodiment, and FIG. 8 is a diagram illustrating a state of the display device of FIG. 7.

Referring to FIGS. 7 and 8, an embodiment of the display device 500 may include a display panel 510 and a display panel driving circuit 520. In such an embodiment, the display device 500 may include a first non-volatile memory device 10 (referred to as NVM1 in FIG. 7) that maintains accumulated stress data for each pixel ASD even when no power is supplied thereto and a second non-volatile memory device 20 (referred to as NVM2 in FIG. 7) that maintains optical compensation data for each pixel CCD even when no power is supplied thereto. In one embodiment, for example, the display device 500 may be an organic light-emitting display device. However, the display device 500 is not limited thereto.

The display panel 510 may include a plurality of pixels P. In an embodiment, the pixels P may include red color display pixels, green color display pixels, and blue color display pixels. The display panel driving circuit 520 may drive the display panel 510. In an embodiment, the display panel driving circuit 520 may include a data driving circuit 521 (referred to as DDC in FIG. 7), a scan driving circuit 522 (referred to as SDC in FIG. 7), a data compensating circuit 523 (referred to as DCC in FIG. 7), and a timing control circuit 524 (referred to as TCON in FIG. 7). The display panel 510 may be electrically connected to the data driving circuit 521 via data-lines. The display panel 510 may be electrically connected to the scan driving circuit 522 via scan-lines. The data driving circuit 521 may provide a data signal DS to the display panel 510 via the data-lines. That is, the data driving circuit 521 may provide the data signal DS to the pixels P of the display panel 510. The scan driving circuit 522 may provide a scan signal SS to the display panel 510 via the scan-lines of the display panel 510. That is, the scan driving circuit 522 may provide the scan signal SS to the pixels P. The data compensating circuit 523 may compensate for input image data IND to generate output image data OUTD corresponding to the data signal DS. In such an embodiment, the data compensating circuit 523 may simultaneously perform afterimage compensation and optical compensation on the input image data IND. In an embodiment, as illustrated in FIG. 7, the data compensating circuit 523 may be independently implemented outside the timing control circuit 524. In such an embodiment, the data compensating circuit 523 may receive the input image data IND generated by an external component (e.g., a graphic processing unit ("GPU"), etc.) via the timing control circuit 524. In an alternative embodiment, the data compensating circuit 523 may be implemented (or included) in the timing control circuit 524, that is, the data compensating circuit 523 is defined by a circuit portion of the timing control circuit 524. In such an embodiment, the data compensating circuit 523 may directly receive the input image data IND generated by the external component. The timing control circuit 524 may generate a plurality of control signals CTL1, CTL2, and CTL3 to provide the control signals CTL1, CTL2, and CTL3 to the data driving circuit 521, the scan driving circuit 522, and the data compensating circuit 523. In such an embodiment, the timing control circuit 524 may control the data driving circuit 521, the scan driving circuit 522, and the data compensating circuit 523.

In an embodiment, as illustrated in FIG. 8, the state (i.e., an operating state) of the display device 500 may be changed among a turn-on state 50, a turn-off state 60, and a sleep state 70. In the turn-on state 50 of the display device 500, the power may be supplied to the display panel 510 and the display panel driving circuit 520. In the turn-off state 60 of the display device 500, the power may not be supplied to the display panel 510 and the display panel driving circuit 520.

In the sleep state 70 of the display device 500, the power may be supplied to only some components included in the display panel 510 and the display panel driving circuit 520. Thus, in the turn-on state 50 of the display device 500, the power may be supplied to the data compensating circuit 523 included in the display panel driving circuit 520, and thus the power may be supplied to an internal memory device (e.g., a volatile memory device) included in the data compensating circuit 523. On the other hand, in the turn-off state 60 of the display device 500, the power may not be supplied to the data compensating circuit 523 included in the display panel driving circuit 520, and thus the power may not be supplied to an internal memory device included in the data compensating circuit 523. In such an embodiment, in the sleep state 70 of the display device 500, the power may not be supplied to the data compensating circuit 523 included in the display panel driving circuit 520, and thus the power may not be supplied to an internal memory device included in the data compensating circuit 523. The state of the display device 500 described above is merely exemplary, and the state of the display device 500 is not limited thereto. In one embodiment, for example, the state of the display device 500 may be changed only between the turn-on state 50 and the turn-off state 60. As illustrated in FIG. 7 and as described, in an embodiment of the display device 500, the first non-volatile memory device 10 that stores the accumulated stress data for each pixel ASD and the second non-volatile memory device 20 that stores the optical compensation data for each pixel CCD may be physically separate from each other. However, when the display device 500 is in the turn-on state 50, the afterimage compensation data for each pixel GCD, which is generated by converting the accumulated stress data for each pixel ASD read from the first non-volatile memory device 10, and the optical compensation data for each pixel CCD, which is read from the second non-volatile memory device 20, may be stored in the same memory device included in the data compensating circuit 523 to compose the luminance compensation data for each pixel LCD. The data compensating circuit 523 may generate the output image data OUTD by compensating for the input image data IND based on the luminance compensation data for each pixel LCD stored in the same memory device included in the data compensating circuit 523.

In an embodiment of the display device 500, the data compensating circuit 523 may include a stress data generating block that generates the stress data for each pixel based on the input image data IND or the output image data OUTD, a memory control block that updates the accumulated stress data for each pixel ASD by accumulating the stress data for each pixel in the first non-volatile memory device 10, a first compensating block that reads the accumulated stress data for each pixel ASD from the first non-volatile memory device 10 and generates the afterimage compensation data for each pixel GCD based on the accumulated stress data for each pixel ASD while the state of the display device 500 is changed from the sleep state 70 or the turn-off state 60 to the turn-on state 50, a compensation data summing block that reads the optical compensation data for each pixel CCD from the second non-volatile memory device 20 that is physically separate from the first non-volatile memory device 10 and generates the luminance compensation data for each pixel LCD by summing the afterimage compensation data for each pixel GCD and the optical compensation data for each pixel CCD while the state of the display device 500 is changed from the sleep state 70 or the turn-off state 60 to the turn-on state 50, an internal memory device that stores the luminance compensation data for each pixel LCD, and a second compensating block that generates the output image data OUTD by compensating for the input image data IND based on the luminance compensation data for each pixel LCD. In an alternative embodiment of the display device 500, the data compensating circuit 523 may include a stress data generating block that generates the stress data for each pixel based on the input image data IND or the output image data OUTD, a first internal memory device that operates at a higher speed than the first non-volatile memory device 10, a memory control block that moves the accumulated stress data for each pixel ASD stored in the first non-volatile memory device 10 into the first internal memory device while the state of the display device 500 is changed from the sleep state 70 or the turn-off state 60 to the turn-on state 50 and updates the accumulated stress data for each pixel ASD by accumulating the stress data for each pixel in the first internal memory device when the state of the display device 500 is the turn-on state 50, a first compensating block that reads the accumulated stress data for each pixel ASD from the first non-volatile memory device 10 and generates the afterimage compensation data for each pixel GCD based on the accumulated stress data for each pixel ASD while the state of the display device 500 is changed from the sleep state 70 or the turn-off state 60 to the turn-on state 50, a compensation data summing block that reads the optical compensation data for each pixel CCD from the second non-volatile memory device 20 that is physically separate from the first non-volatile memory device 10 and generates the luminance compensation data for each pixel LCD by summing the afterimage compensation data for each pixel GCD and the optical compensation data for each pixel CCD while the state of the display device 500 is changed from the sleep state 70 or the turn-off state 60 to the turn-on state 50, a second internal memory device that stores the luminance compensation data for each pixel LCD, and a second compensating block that generates the output image data OUTD by compensating for the input image data IND based on the luminance compensation data for each pixel LCD. Since other features of the data compensating circuit 523 are substantially the same as those described above, any repetitive detailed description thereof will be omitted.

Figure 9:
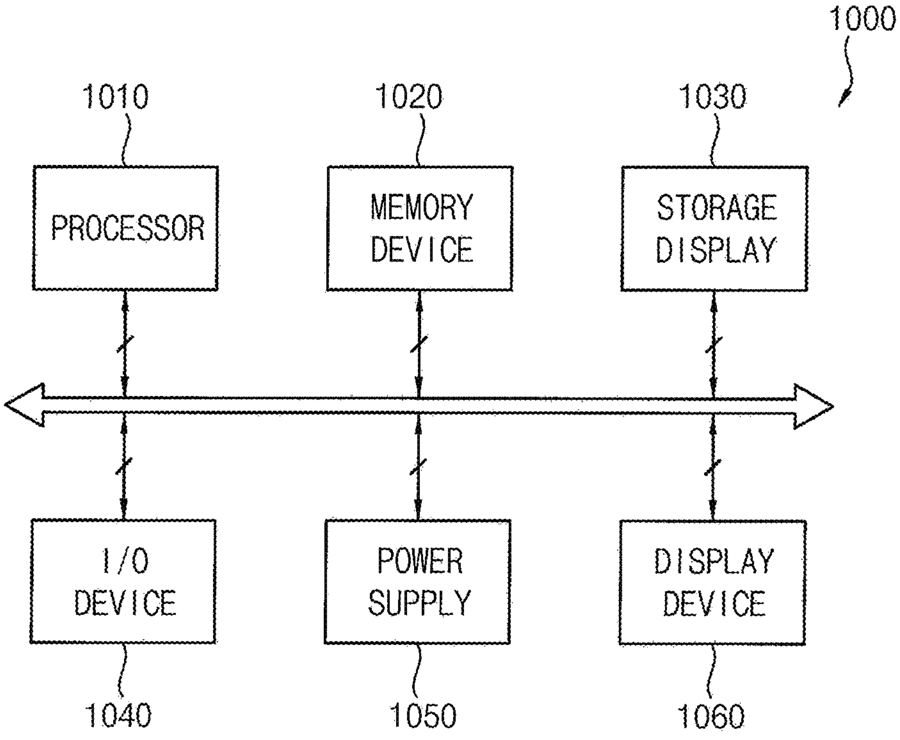
FIG. 9 is a block diagram illustrating an electronic device according to an embodiment.
Figure 10:
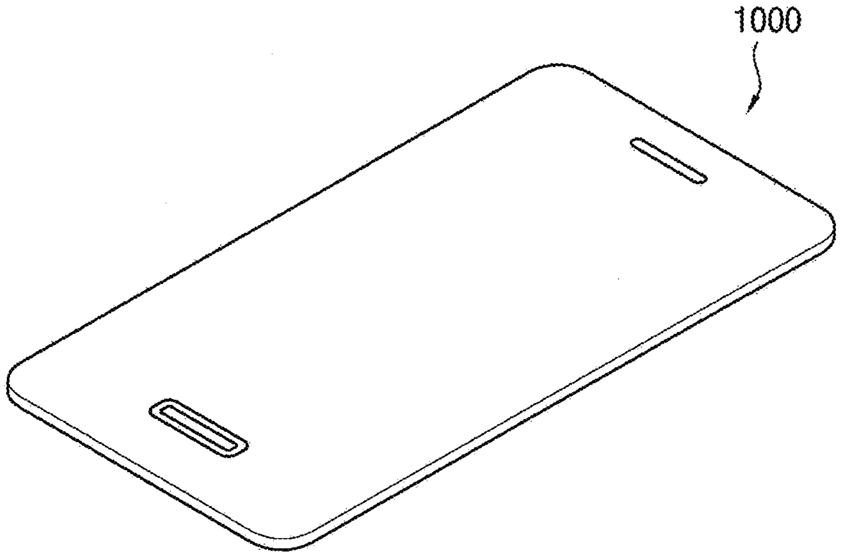
FIG. 10 is a diagram illustrating an embodiment in which the electronic device of FIG. 9 is implemented as a smart phone.

FIG. 9 is a block diagram illustrating an electronic device according to an embodiment, and FIG. 10 is a diagram illustrating an embodiment in which the electronic device of FIG. 9 is implemented as a smart phone.

Referring to FIGS. 9 and 10, an embodiment of the electronic device 1000 may include a processor 1010, a memory device 1020, a storage device 1030, an input/output ("I/O") device 1040, a power supply 1050, and a display device 1060. In such an embodiment, the display device 1060 may be the display device 500 of FIG. 7. In such an embodiment, the electronic device 1000 may further include a plurality of ports for communicating with a video card, a sound card, a memory card, a universal serial bus ("USB") device, other electronic devices, etc. In an embodiment, as illustrated in FIG. 10, the electronic device 1000 may be implemented as a smart phone. However, the electronic device 1000 is not limited thereto. In one embodiment, for example, the electronic device 1000 may be implemented as a cellular phone, a video phone, a smart pad, a smart watch, a tablet personal computer ("PC"), a car navigation system, a computer monitor, a laptop computer, a head mounted display ("HMD") device, etc.

The processor 1010 may perform various computing functions. The processor 1010 may be a microprocessor, a central processing unit ("CPU") or an application processor ("AP"), for example. The processor 1010 may be coupled to other components via an address bus, a control bus, a data bus, etc. In such an embodiment, the processor 1010 may be coupled to an extended bus such as a peripheral component interconnection ("PCI") bus. The memory device 1020 may store data for operations of the electronic device 1000. In one embodiment, for example, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc. and/or at least one volatile memory device such as a dynamic random access memory ("DRAM") device, a static random access memory ("SRAM") device, a mobile DRAM device, etc. The storage device 1030 may include a solid state drive ("SSD") device, a hard disk drive ("HDD") device, a CD-ROM device, etc. The I/O device 1040 may include an input device such as a keyboard, a keypad, a mouse device, a touch pad, a touch screen, etc., and an output device such as a printer, a speaker, etc. In some embodiments, the display device 1060 may also function as the I/O device 1040. The power supply 1050 may provide power for operations of the electronic device 1000. The display device 1060 may be coupled to other components via the buses or other communication links.

The display device 1060 may display an image corresponding to visual information of the electronic device 1000. In an embodiment, as described above, the display device 1060 may improve an image quality by performing afterimage compensation and optical compensation. In such an embodiment, the display device 1060 may efficiently use memory devices included in the display device 1060 by simultaneously performing the afterimage compensation and the optical compensation.

In such an embodiment, the display device 1060 may include a display panel including a plurality of pixels, a data driving circuit that provides a data signal to the display panel, a scan driving circuit that provides a scan signal to the display panel, a data compensating circuit that compensates for input image data to generate output image data corresponding to the data signal, and a timing control circuit that controls the data driving circuit, the scan driving circuit, and the data compensating circuit. In an embodiment, the data compensating circuit may include a stress data generating block that generates stress data for each pixel based on the input image data or the output image data, a memory control block that updates accumulated stress data for each pixel by accumulating the stress data for each pixel in a first non-volatile memory device, a first compensating block that reads the accumulated stress data for each pixel from the first non-volatile memory device and generates afterimage compensation data for each pixel based on the accumulated stress data for each pixel while a state of the display device 1060 is changed from a sleep state or a turn-off state to a turn-on state, a compensation data summing block that reads optical compensation data for each pixel from a second non-volatile memory device that is physically separate from the first non-volatile memory device and generates luminance compensation data for each pixel by summing the afterimage compensation data for each pixel and the optical compensation data for each pixel while the state of the display device 1060 is changed from the sleep state or the turn-off state to the turn-on state, an internal memory device that stores the luminance compensation data for each pixel, and a second compensating block that generates the output image data by compensating for the input image data based on the luminance compensation data for each pixel.

In an alternative embodiment, the data compensating circuit may include a stress data generating block that generates the stress data for each pixel based on the input image data or the output image data, a first internal memory device that operates at a higher speed than a first non-volatile memory device, a memory control block that moves the accumulated stress data for each pixel stored in the first non-volatile memory device into the first internal memory device while the state of the display device 1060 is changed from the sleep state or the turn-off state to the turn-on state and updates the accumulated stress data for each pixel by accumulating the stress data for each pixel in the first internal memory device when the state of the display device 1060 is the turn-on state, a first compensating block that reads the accumulated stress data for each pixel from the first non-volatile memory device and generates the afterimage compensation data for each pixel based on the accumulated stress data for each pixel while the state of the display device 1060 is changed from the sleep state or the turn-off state to the turn-on state, a compensation data summing block that reads the optical compensation data for each pixel from a second non-volatile memory device that is physically separate from the first non-volatile memory device and generates the luminance compensation data for each pixel by summing the afterimage compensation data for each pixel and the optical compensation data for each pixel while the state of the display device 1060 is changed from the sleep state or the turn-off state to the turn-on state, a second internal memory device that stores the luminance compensation data for each pixel, and a second compensating block that generates the output image data by compensating for the input image data based on the luminance compensation data for each pixel. Since these are described above, duplicated description related thereto will not be repeated.

Embodiments of the invention may be applied to a display device and an electronic device including the display device, e.g., a smart phone, a cellular phone, a video phone, a smart pad, a smart watch, a tablet PC, a car navigation system, a television, a computer monitor, a laptop computer, a head mounted display device, an MP3 player, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A data compensating circuit comprising:

a stress data generating block which generates stress data for each pixel based on input image data or output image data, wherein the stress data for each pixel is a value corresponding to a gray-level for each pixel of the input image data or the output image data;

a memory control block which updates accumulated stress data for each pixel by accumulating the stress data for each pixel in a first non-volatile memory device, wherein the accumulated stress data for each pixel is a value generated by accumulating the value corresponding to the gray-level for each pixel of the input image data or the output image data;

a first compensating block which reads the accumulated stress data for each pixel from the first non-volatile memory device during a state changing period in which a state of a display device is changed from a sleep state or a turn-off state to a turn-on state and generates afterimage compensation data for each pixel based on the accumulated stress data for each pixel during the state changing period in which the state of the display device is changed from the sleep state or the turn-off state to the turn-on state;

a compensation data summing block which reads optical compensation data for each pixel from a second non-volatile memory device during the state changing period in which the state of the display device is changed from the sleep state or the turn-off state to the turn-on state, receives the afterimage compensation data for each pixel from the first compensating block during the state changing period in which the state of the display device is changed from the sleep state or the turn-off state to the turn-on state, and generates luminance compensation data for each pixel by summing the afterimage compensation data for each pixel and the optical compensation data for each pixel during the state changing period in which the state of the display device is changed from the sleep state or the turn-off state to the turn-on state, wherein the second non-volatile memory device is physically separate from the first non-volatile memory device, and the optical compensation data for each pixel includes information on a luminance compensation amount for each pixel corresponding to a luminance drop amount for each pixel due to optical characteristic deviation in a manufacturing process of the display device;

an internal memory device which receives and stores the luminance compensation data for each pixel from the compensation data summing block, wherein the internal memory device is a volatile memory device; and a second compensating block which reads the luminance compensation data for each pixel from the internal memory device and generates the output image data by compensating for the input image data based on the luminance compensation data for each pixel.

2. The data compensating circuit of claim 1, wherein the luminance compensation data for each pixel stored in the internal memory device is lost after the state of the display device is changed from the turn-on state to the sleep state or the turn-off state.

3. The data compensating circuit of claim 2, wherein the internal memory device operates at a higher speed than the first and second non-volatile memory devices, each of the first and second non-volatile memory devices is a flash memory device, and the internal memory device is a static random access memory device.

4. The data compensating circuit of claim 1, wherein the first compensating block generates the afterimage compensation data for each pixel by reading only a portion of the accumulated stress data for each pixel from the first non-volatile memory device.

5. The data compensating circuit of claim 4, wherein the accumulated stress data for each pixel has a first size, and each of the afterimage compensation data for each pixel and the optical compensation data for each pixel has a second size which is smaller than the first size.

6. The data compensating circuit of claim 1, wherein the first compensating block does not read the accumulated stress data for each pixel from the first non-volatile memory device after the state of the display device is changed from the sleep state or the turn-off state to the turn-on state.

7. The data compensating circuit of claim 6, wherein the memory control block updates the accumulated stress data for each pixel by accumulating the stress data for each pixel in the first non-volatile memory device in real-time after the state of the display device is changed from the sleep state or the turn-off state to the turn-on state.

8. A data compensating circuit comprising:

a stress data generating block which generates stress data for each pixel based on input image data or output image data, wherein the stress data for each pixel is a value corresponding to a gray-level for each pixel of the input image data or the output image data;

a first internal memory device which operates at a higher speed than a first non-volatile memory device, wherein the first internal memory device is a volatile memory device;

a memory control block which moves accumulated stress data for each pixel stored in the first non-volatile memory device into the first internal memory device while a state of a display device is changed from a sleep state or a turn-off state to a turn-on state and updates the accumulated stress data for each pixel by accumulating the stress data for each pixel in the first internal memory device when the state of the display device is the turn-on state, wherein the accumulated stress data for each pixel is a value generated by accumulating the value corresponding to the gray-level for each pixel of the input image data or the output image data;

a first compensating block which reads the accumulated stress data for each pixel from the first non-volatile memory device during a state changing period in which the state of the display device is changed from the sleep state or the turn-off state to the turn-on state and generates afterimage compensation data for each pixel based on the accumulated stress data for each pixel during the state changing period in which the state of the display device is changed from the sleep state or the turn-off state to the turn-on state;

a compensation data summing block which reads optical compensation data for each pixel from a second non-volatile memory device during the state changing period in which the state of the display device is changed from the sleep state or the turn-off state to the turn-on state, receives the afterimage compensation data for each pixel from the first compensating block during the state changing period in which the state of the display device is changed from the sleep state or the turn-off state to the turn-on state, and generates luminance compensation data for each pixel by summing the afterimage compensation data for each pixel and the optical compensation data for each pixel during the state changing period in which the state of the display device is changed from the sleep state or the turn-off state to the turn-on state, wherein the second non-volatile memory device is physically separate from the first non-volatile memory device, and the optical compensation data for each pixel includes information on a luminance compensation amount for each pixel corresponding to a luminance drop amount for each pixel due to optical characteristic deviation in a manufacturing process of the display device;

a second internal memory device which receives and stores the luminance compensation data for each pixel from the compensation data summing block, wherein the second internal memory device is a volatile memory device; and a second compensating block which reads the luminance compensation data for each pixel from the second internal memory device and generates the output image data by compensating for the input image data based on the luminance compensation data for each pixel.

9. The data compensating circuit of claim 8, wherein the accumulated stress data for each pixel stored in the first internal memory device is lost and the luminance compensation data for each pixel stored in the second internal memory device is lost after the state of the display device is changed from the turn-on state to the sleep state or the turn-off state.

10. The data compensating circuit of claim 9, wherein the first and second internal memory devices operate at a higher speed than the first and second non-volatile memory devices, each of the first and second non-volatile memory devices is a flash memory device, and each of the first and second internal memory devices is a static random access memory device.

11. The data compensating circuit of claim 8, wherein the first compensating block generates the afterimage compensation data for each pixel by reading only a portion of the accumulated stress data for each pixel from the first non-volatile memory device.

12. The data compensating circuit of claim 11, wherein the accumulated stress data for each pixel has a first size, and each of the afterimage compensation data for each pixel and the optical compensation data for each pixel has a second size which is smaller than the first size.

13. The data compensating circuit of claim 8, wherein the first compensating block does not read the accumulated stress data for each pixel from the first non-volatile memory device after the state of the display device is changed from the sleep state or the turn-off state to the turn-on state.

14. The data compensating circuit of claim 13, wherein the memory control block backs up the accumulated stress data for each pixel stored in the first internal memory device to the first non-volatile memory device at a predetermined cycle after the state of the display device is changed from the sleep state or the turn-off state to the turn-on state.

15. A display device comprising:

a display panel including a plurality of pixels;

a data driving circuit which provides a data signal to the display panel;

a scan driving circuit which provides a scan signal to the display panel;

a data compensating circuit which compensates for input image data to generate output image data corresponding to the data signal; and a timing control circuit which controls the data driving circuit, the scan driving circuit, and the data compensating circuit, wherein the data compensating circuit includes:

a stress data generating block which generates stress data for each pixel based on the input image data or the output image data, wherein the stress data for each pixel is a value corresponding to a gray-level for each pixel of the input image data or the output image data;

a memory control block which updates accumulated stress data for each pixel by accumulating the stress data for each pixel in a first non-volatile memory device, wherein the accumulated stress data for each pixel is a value generated by accumulating the value corresponding to the gray-level for each pixel of the input image data or the output image data;

a first compensating block which reads the accumulated stress data for each pixel from the first non-volatile memory device a state of the display device is changed from a sleep state or a turn-off state to a turn-on state and generates afterimage compensation data for each pixel based on the accumulated stress data for each pixel during a state changing period in which the state of the display device is changed from the sleep state or the turn-off state to the turn-on state;

a compensation data summing block which reads optical compensation data for each pixel from a second non-volatile memory device during the state changing period in which the state of the display device is changed from the sleep state or the turn-off state to the turn-on state, receives the afterimage compensation data for each pixel from the first compensating block during the state changing period in which the state of the display device is changed from the sleep state or the turn-off state to the turn-on state, and generates luminance compensation data for each pixel by summing the afterimage compensation data for each pixel and the optical compensation data for each pixel during the state changing period in which the state of the display device is changed from the sleep state or the turn-off state to the turn-on state, wherein the second non-volatile memory device is physically separate from the first non-volatile memory device, and the optical compensation data for each pixel includes information on a luminance compensation amount for each pixel corresponding to a luminance drop amount for each pixel due to optical characteristic deviation in a manufacturing process of the display device;

an internal volatile memory device which receives and stores the luminance compensation data for each pixel from the compensation data summing block; and a second compensating block which reads the luminance compensation data for each pixel from the internal volatile memory device and generates the output image data by compensating for the input image data based on the luminance compensation data for each pixel.

16. The display device of claim 15, wherein the data compensating circuit is included in the timing control circuit.

17. The display device of claim 15, wherein the first compensating block generates the afterimage compensation data for each pixel by reading only a portion of the accumulated stress data for each pixel from the first non-volatile memory device.

18. The display device of claim 17, wherein the accumulated stress data for each pixel has a first size, and each of the afterimage compensation data for each pixel and the optical compensation data for each pixel has a second size which is smaller than the first size.

19. The display device of claim 15, wherein the first compensating block does not read the accumulated stress data for each pixel from the first non-volatile memory device after the state of the display device is changed from the sleep state or the turn-off state to the turn-on state.

20. The display device of claim 19, wherein the memory control block updates the accumulated stress data for each pixel by accumulating the stress data for each pixel in the first non-volatile memory device in real-time after the state of the display device is changed from the sleep state or the turn-off state to the turn-on state.

* * * * *